United States Patent
Horn et al.

(10) Patent No.: US 12,074,750 B2
(45) Date of Patent: Aug. 27, 2024

(54) REPETITION ON SUBCARRIERS FOR NONCOHERENT MODULATION

(71) Applicant: QUALCOMM Incorporated, San Diego, CA (US)

(72) Inventors: Idan Michael Horn, Hod Hasharon (IL); Assaf Touboul, Netanya (IL); Shay Landis, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/184,966

(22) Filed: Feb. 25, 2021

(65) Prior Publication Data

US 2021/0336834 A1 Oct. 28, 2021

Related U.S. Application Data

(60) Provisional application No. 63/016,280, filed on Apr. 27, 2020.

(51) Int. Cl.
*H04L 27/26* (2006.01)
*H04L 1/00* (2006.01)
(Continued)

(52) U.S. Cl.
CPC ...... *H04L 27/26132* (2021.01); *H04L 1/0067* (2013.01); *H04L 5/001* (2013.01);
(Continued)

(58) Field of Classification Search
None
See application file for complete search history.

(56) References Cited

U.S. PATENT DOCUMENTS 9,137,076 B2 9/2015 Luo et al.
2003/0081576 A1* 5/2003 Kim ............... H04L 1/0069
370/335
(Continued)

FOREIGN PATENT DOCUMENTS

CN 101322345 A 12/2008
CN 101346918 A 1/2009
(Continued)

OTHER PUBLICATIONS

International Search Report and Written Opinion—PCT/US2021/020055—ISA/EPO—Jun. 23, 2021.

*Primary Examiner* — Rebecca E Song
(74) *Attorney, Agent, or Firm* — Sevan Savsa; Holland & Hart LLP

(57) ABSTRACT

Methods, systems, and devices for wireless communications are described. A transmitting device may encode a set of bits to transmit to a receiving device based on a repetition factor. The transmitting device may map, based on the repetition factor, the set of encoded bits to a subset of subcarriers such as adjacent subcarriers of a set of subcarriers. The transmitting device may generate a signal including the set of encoded bits based on the mapping, and transmit the generated signal to the receiving device. The receiving device may receive a modulated signal from the transmitting device, and identify, based on a repetition factor, a subset of subcarriers including adjacent subcarriers of a set of subcarriers associated with the modulated signal. The receiving device may average the subset of subcarriers including the adjacent subcarriers, and demodulate the modulated signal in accordance with the averaged subset of subcarriers including the adjacent subcarriers.

28 Claims, 16 Drawing Sheets

(51) Int. Cl.
*H04L 5/00* (2006.01)
*H04L 27/233* (2006.01)

(52) U.S. Cl.
CPC ........ *H04L 5/0098* (2013.01); *H04L 27/2332* (2013.01); *H04L 27/26025* (2021.01); *H04L 27/2637* (2013.01); *H04L 27/2653* (2013.01); *H04L 27/2666* (2013.01)

(56) References Cited

U.S. PATENT DOCUMENTS

| | | | | |
|---|---|---|---|---|
| 2009/0109999 | A1* | 4/2009 | Kuri | H04L 1/0028 |
| | | | | 370/465 |
| 2009/0233598 | A1* | 9/2009 | Fukuoka | H04B 1/7107 |
| | | | | 455/434 |
| 2010/0040010 | A1* | 2/2010 | You | H04W 72/04 |
| | | | | 370/329 |
| 2011/0110304 | A1 | 5/2011 | Kuchi et al. | |
| 2011/0317615 | A1* | 12/2011 | Soong | H04L 1/0067 |
| | | | | 370/329 |
| 2012/0057649 | A1* | 3/2012 | Miyoshi | H04L 1/0067 |
| | | | | 375/295 |
| 2012/0128087 | A1* | 5/2012 | Miyoshi | H04L 27/2647 |
| | | | | 375/260 |
| 2019/0222967 | A1* | 7/2019 | Ratilainen | H04L 1/0003 |
| 2020/0077414 | A1* | 3/2020 | Ye | H04L 1/0013 |

FOREIGN PATENT DOCUMENTS

| | | | |
|---|---|---|---|
| CN | 101689905 A | 3/2010 | |
| WO | WO-2005069574 A1 * | 7/2005 | ........... H04L 1/0003 |
| WO | WO-2011053836 | 5/2011 | |
| WO | WO-2019032034 A1 | 2/2019 | |

* cited by examiner

REPETITION ON SUBCARRIERS FOR NONCOHERENT MODULATION

CROSS REFERENCE

The present application for patent claims the benefit of U.S. Provisional Patent Application No. 63/016,280 by HORN et al., entitled "REPETITION ON SUBCARRIERS FOR NONCOHERENT MODULATION," filed Apr. 27, 2020, assigned to the assignee hereof, and expressly incorporated by reference herein.

FIELD OF TECHNOLOGY

The following relates generally to wireless communications and more specifically to repetition on subcarriers for noncoherent modulation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the described techniques relate to configuring a communication device to support repetition on subcarriers for noncoherent modulation. The communication device may reduce impacts of noise related to various modulation schemes, such as differential phase shift keying (DPSK) modulation by providing repetition on subcarriers for noncoherent modulation. In some examples, the communication device may increase a signal to noise ratio (SNR) of a signal by providing repetition of the signal on subcarriers. The communication device may, for example, be configured to map the signal according to a repetition factor R over multiple adjacent subcarriers. The communication device may be configured with a resource element mapper to apply the repetition to subcarriers to increase signal margin (e.g., increasing the SNR) of the signal.

For example, the communication device may encode a set of bits according to the repetition factor, and may map the set of encoded bits to a subset of subcarriers, such as adjacent subcarriers. The communication device may generate a signal that includes the set of encoded bits, and may transmit the signal carrying the repeated subcarriers. Additionally or alternatively, the communication device may be configured to receive a signal and identify a subset of adjacent subcarriers (e.g., the subcarriers mapped according to the repetition factor R). The communication device may average the signal over the adjacent subcarriers, and may demodulate the averaged signal accordingly. The described techniques may, as a result, include features for improvements to wireless communications and, in some examples, may promote enhanced efficiency for high reliability and low latency wireless communications in 5G systems, among other benefits.

A method for wireless communications at a transmitting device is described. The method may include encoding a set of bits to transmit to a receiving device based at least in part on a repetition factor, mapping, based at least in part on the repetition factor, the set of encoded bits to a subset of subcarriers comprising adjacent subcarriers of a set of subcarriers, generating a signal comprising the set of encoded bits based at least in part on the mapping, and transmitting the generated signal to the receiving device.

An apparatus for wireless communications is described. The apparatus may include a processor, memory coupled with the processor, and instructions stored in the memory. The instructions may be executable by the processor to cause the apparatus to encode a set of bits to transmit to a receiving device based at least in part on a repetition factor, map, based at least in part on the repetition factor, the set of encoded bits to a subset of subcarriers comprising adjacent subcarriers of a set of subcarriers, generate a signal comprising the set of encoded bits based at least in part on the mapping, and transmit the generated signal to the receiving device.

Another apparatus for wireless communications is described. The apparatus may include means for encoding a set of bits to transmit to a receiving device based at least in part on a repetition factor, means for mapping, based at least in part on the repetition factor, the set of encoded bits to a subset of subcarriers comprising adjacent subcarriers of a set of subcarriers, means for generating a signal comprising the set of encoded bits based at least in part on the mapping, and means for transmitting the generated signal to the receiving device.

A non-transitory computer-readable medium storing code for wireless communications at a transmitting device is described. The code may include instructions executable by a processor to encode a set of bits to transmit to a receiving device based at least in part on a repetition factor, map, based at least in part on the repetition factor, the set of encoded bits to a subset of subcarriers comprising adjacent subcarriers of a set of subcarriers, generate a signal comprising the set of encoded bits based at least in part on the mapping, and transmit the generated signal to the receiving device.

Some examples of the method, apparatuses, and non-transitory computer-readable medium described herein may further include operations, features, means, or instructions for identifying a set of data bits associated with the set of encoded bits, and recursively mapping, based at least in part on the repetition factor, the set of data bits to the subset of subcarriers comprising the adjacent subcarriers.

Some examples of the method, apparatuses, and non-transitory computer-readable medium described herein for recursively mapping the set of data bits may further include operations, features, means, or instructions for mapping a first subset of data bits associated with the set of data bits to a first subset of adjacent subcarriers, and mapping a second subset of data bits associated with the set of data bits to a second subset of adjacent subcarriers based at least in part on the repetition factor.

Some examples of the method, apparatuses, and non-transitory computer-readable medium described herein may further include operations, features, means, or instructions for rate matching the set of encoded bits based at least in part on the repetition factor.

Some examples of the method, apparatuses, and non-transitory computer-readable medium described herein may further include operations, features, means, or instructions for mapping the subset of subcarriers comprising the adjacent subcarriers to a resource block based at least in part on the repetition factor, and generating the signal based at least in part on mapping the subset of subcarriers to the resource block.

Some examples of the method, apparatuses, and non-transitory computer-readable medium described herein for encoding the set of bits may further include operations, features, means, or instructions for increasing a rate of the encoding based at least in part on the repetition factor.

In some examples of the method, apparatuses, and non-transitory computer-readable medium described herein, the rate of the encoding comprises a value less than one.

Some examples of the method, apparatuses, and non-transitory computer-readable medium described herein may further include operations, features, means, or instructions for identifying the set of bits to transmit to the receiving device based at least in part on the repetition factor.

In some examples of the method, apparatuses, and non-transitory computer-readable medium described herein, a value of the repetition factor is based at least in part on a modulation and coding scheme (MCS) value, a constellation mapping configuration, a frequency allocation parameter, or a channel condition, or any combination thereof.

In some examples of the method, apparatuses, and non-transitory computer-readable medium described herein, the mapping comprises a non-coherent modulation mapping.

Some examples of the method, apparatuses, and non-transitory computer-readable medium described herein may further include operations, features, means, or instructions for transmitting a downlink control information (DCI) message comprising an indication of the repetition factor.

Some examples of the method, apparatuses, and non-transitory computer-readable medium described herein may further include operations, features, means, or instructions for identifying the repetition factor in a lookup table, wherein encoding the set of bits to transmit to the receiving device is based at least in part on identifying the repetition factor in the lookup table.

Some examples of the method, apparatuses, and non-transitory computer-readable medium described herein may further include operations, features, means, or instructions for transmitting a radio resource control (RRC) connection establishment message comprising a set of parameters indicating the repetition factor per MCS.

A method for wireless communications at a receiving device is described. The method may include receiving a modulated signal from a transmitting device, identifying, based at least in part on a repetition factor, a subset of subcarriers comprising adjacent subcarriers of a set of subcarriers associated with the modulated signal, averaging the subset of subcarriers comprising the adjacent subcarriers, and demodulating the modulated signal in accordance with the averaged subset of subcarriers comprising the adjacent subcarriers.

An apparatus for wireless communications is described. The apparatus may include a processor, memory coupled with the processor, and instructions stored in the memory. The instructions may be executable by the processor to cause the apparatus to receive a modulated signal from a transmitting device, identify, based at least in part on a repetition factor, a subset of subcarriers comprising adjacent subcarriers of a set of subcarriers associated with the modulated signal, average the subset of subcarriers comprising the adjacent subcarriers, and demodulate the modulated signal in accordance with the averaged subset of subcarriers comprising the adjacent subcarriers.

Another apparatus for wireless communications is described. The apparatus may include means for receiving a modulated signal from a transmitting device, means for identifying, based at least in part on a repetition factor, a subset of subcarriers comprising adjacent subcarriers of a set of subcarriers associated with the modulated signal, means for averaging the subset of subcarriers comprising the adjacent subcarriers, and means for demodulating the modulated signal in accordance with the averaged subset of subcarriers comprising the adjacent subcarriers.

A non-transitory computer-readable medium storing code for wireless communications at a receiving device is described. The code may include instructions executable by a processor to receive a modulated signal from a transmitting device, identify, based at least in part on a repetition factor, a subset of subcarriers comprising adjacent subcarriers of a set of subcarriers associated with the modulated signal, average the subset of subcarriers comprising the adjacent subcarriers, and demodulate the modulated signal in accordance with the averaged subset of subcarriers comprising the adjacent subcarriers.

Some examples of the method, apparatuses, and non-transitory computer-readable medium described herein may further include operations, features, means, or instructions for averaging data samples of the subset of subcarriers comprising the adjacent subcarriers, wherein demodulating the modulated signal is based at least in part on averaging the data samples of the subset of subcarriers comprising the adjacent subcarriers.

Some examples of the method, apparatuses, and non-transitory computer-readable medium described herein for averaging the data samples of the subset of subcarriers may further include operations, features, means, or instructions for averaging the data samples of the subset of subcarriers comprising the adjacent subcarriers based at least in part on a coherent combination of the data samples.

Some examples of the method, apparatuses, and non-transitory computer-readable medium described herein for demodulating the modulated signal may further include operations, features, means, or instructions for demapping the averaged subset of subcarriers comprising the adjacent subcarriers based at least in part on the repetition factor.

Some examples of the method, apparatuses, and non-transitory computer-readable medium described herein may further include operations, features, means, or instructions for decoding the averaged subset of subcarriers comprising the adjacent subcarriers to a set of modulated data bits based at least in part on the repetition factor.

In some examples of the method, apparatuses, and non-transitory computer-readable medium described herein, the subset of subcarriers comprises repeated data based at least in part on the repetition factor.

Some examples of the method, apparatuses, and non-transitory computer-readable medium described herein may further include operations, features, means, or instructions for receiving a DCI message comprising an indication of the repetition factor.

Some examples of the method, apparatuses, and non-transitory computer-readable medium described herein may further include operations, features, means, or instructions for identifying the repetition factor in a lookup table.

Some examples of the method, apparatuses, and non-transitory computer-readable medium described herein may further include operations, features, means, or instructions for receiving an RRC connection establishment message comprising a set of parameters indicating the repetition factor per MCS.

DETAILED DESCRIPTION

Figure 1:
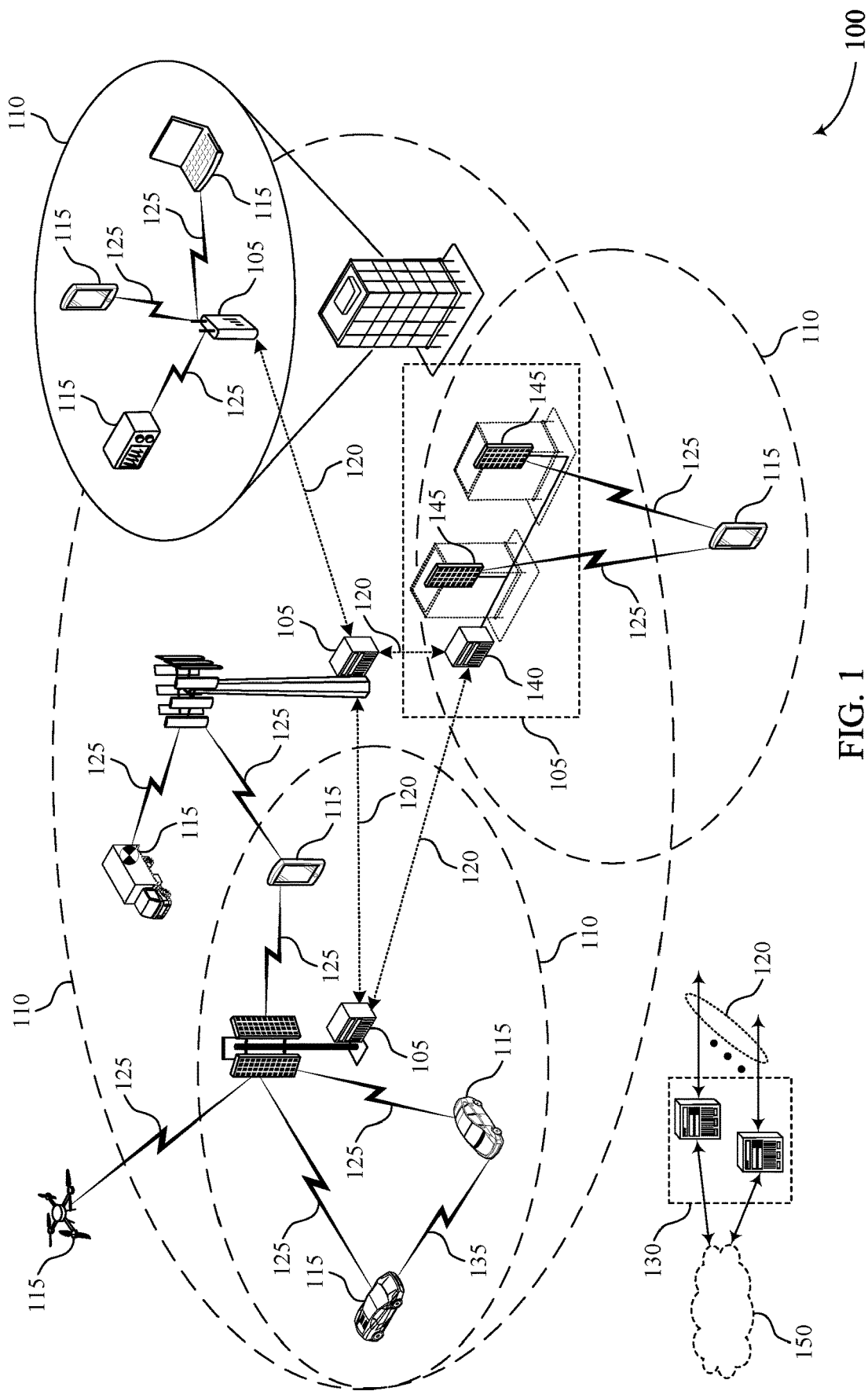
FIGS. 1 and 2 illustrate examples of wireless communications systems that support repetition on subcarriers for noncoherent modulation in accordance with aspects of the present disclosure.

Some wireless communications systems may include communication devices, such as user equipment (UEs) and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The communication devices may support various modulation schemes, such as noncoherent differential phase shift keying (DPSK) modulation, which may be used to increase efficiency for wireless communications. For example, noncoherent DPSK modulation may be used for high reliability and low latency wireless communications, such as in ultra-reliable low latency communications (URLLC). The communication devices may be configured, as part of the DPSK modulation, to multiply subcarriers with conjugate adjacent subcarriers in a time domain. Multiplying the subcarriers with conjugate adjacent subcarriers may, however, cause adverse impacts on a signal. For instance, multiplying subcarriers with conjugate adjacent subcarriers during modulation may also multiply or amplify noise associated with the adjacent subcarriers. In some cases, such as low signal to noise ratios (SNR), the multiplied noise may negatively affect signaling performance for the communication devices. To reduce the effects of the amplified noise, the communication devices may increase an SNR of a signal.

The communication devices may be configured to increase an SNR and a gain of a signal by communicating the signal using a number of repetitions, which may be configured by a repetition factor R. The communication devices may identify a number of information bits, and perform channel coding and rate matching on the information bits according to the repetition factor. The communication devices may be configured to determine a repetition based on the repetition factor and map, via a resource element mapper, the coded rate matched bits to one or more subcarriers of a resource block according to the repetition factor. The communication devices generate a signal based on the mapping, where the signal includes repeated subcarriers on the resource block. Additionally or alternatively, the communication devices may be configured to receive a signal and average information (e.g., data samples) according to a repetition factor R. For example, the communication devices may be configured to average repeated bits (e.g., data samples) received in the signal. The communication devices may identify adjacent subcarriers carrying repeated bits according to the repetition factor, and may average the value of the adjacent subcarriers based on the repetition. The communication devices may demodulate symbols and estimate bits according to the mapping.

Aspects of the subject matter described in this disclosure may be implemented to realize one or more of the following potential improvements, among others. The techniques employed by the communication devices may provide benefits and enhancements to the operation of the communication devices. For example, operations performed by the communication devices may provide improvements to wireless communications. In some examples, configuring the communication devices to provide repetition on subcarriers for noncoherent modulation may support improvements to power consumption, spectral efficiency, and, in some examples, may promote enhanced efficiency for wireless communications operations, among other benefits.

Aspects of the disclosure are initially described in the context of wireless communications systems. For example, aspects of the disclosure are described with respect to communications between transmitting and receiving devices of the wireless communications system. Aspects of the disclosure are further illustrated by and described with reference to apparatus diagrams, system diagrams, and flowcharts including process flow diagrams from both a transmitting device and receiving device perspective that relate to repetition on subcarriers for noncoherent modulation.

FIG. 1 illustrates an example of a wireless communications system 100 that supports repetition on subcarriers for noncoherent modulation in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support increasing an SNR associated with downlink and uplink communications (also referred to as downlink and uplink signals) by providing repetition of the downlink and uplink communications. In some examples, a base station 105 may be referred to as a transmitting device, while a UE 115 may be referred to as a receiving device. In some other examples, a base station 105 may be referred to as a receiving device, while a UE 115 may be referred to as a transmitting device. A base station 105 or a UE 115, or both, may map information bits (e.g., control bits, data bits) associated with a signal based on a repetition factor R. The base station 105 or the UE 115, or both, may be configured to use a resource element mapper to map the signal to one or more subcarriers associated with a resource grid including one or more resource blocks having multiple resource elements.

The base station 105 or the UE 115, or both, may be configured to use a resource element mapper to map the signal to one or more subcarriers in the resource grid, according to a repetition factor to increase an SNR and a gain for the signal. Additionally or alternatively, the base station 105 or the UE 115, or both, may be configured to average information bits (e.g., control bits, data bits) received according to the repetition factor R. For example, the base station 105 or the UE 115, or both, may be configured to average repeated information bits (e.g., samples) received in a signal before demodulating the averaged samples. The wireless communications system 100 may, as a result, include features for improvements to wireless communications between the base stations 105 and the UEs 115 and, in some examples, may promote enhanced efficiency for high reliability and low latency wireless communications in 5G systems, among other benefits.

Figure 2:
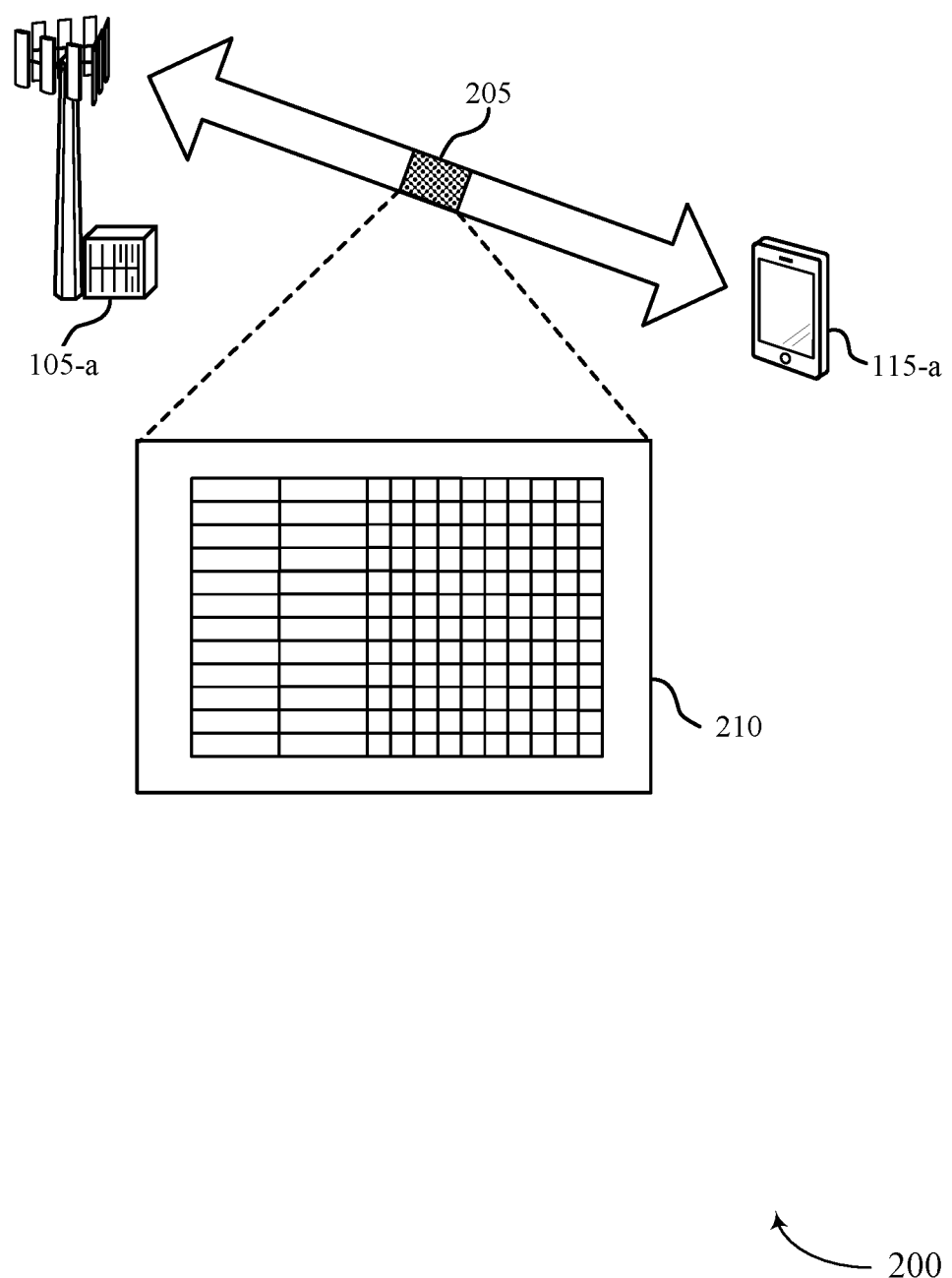

FIG. 2 illustrates an example of a wireless communications system 200 that supports repetition on subcarriers for noncoherent modulation in accordance with aspects of the present disclosure. The wireless communications system 200 may implement or be implemented by aspects of the wireless communications system 100 or may implement aspects of the wireless communications systems 100. For example, the wireless communications system 200 may include a base station 105-*a* and a UE 115-*a*, which may be examples of a base station 105 and a UE 115 described herein. The wireless communications system 200 may support multiple radio access technologies including 4G systems such as LTE systems, LTE-A systems, or LTE-A Pro systems, and 5G systems, which may be referred to as NR systems.

The wireless communications system 200 may support various modulation and demodulation schemes, such as noncoherent DPSK modulation. The base station 105-*a* or the UE 115-*a*, or both, may use noncoherent DPSK modulation to improve efficiency in the wireless communications system 200. For example, noncoherent DPSK modulation may provide high reliability and low latency wireless communications, such as in PDCCH URLLC. In noncoherent DPSK modulation, the base station 105-*a* or the UE 115-*a*, or both, may bypass coherent channel estimation and channel equalization, which may reduce latency for wireless communications in the wireless communications system 200.

In the example of FIG. 2, the base station 105-*a* may be referred to as a transmitting device, while the UE 115-*a* may be referred to as a receiving device. In some examples, the base station 105-*a* may be referred to as a receiving device, while the UE 115-*a* may be referred to as a transmitting device. The base station 105-*a* may select one or more subcarriers for a signal 205 carrying information (e.g., control, data) to transmit to the UE 115-*a*. As part of DPSK demodulation, the base station 105-*a* may combine information (e.g., data bits) of one or more conjugate subcarriers that are adjacent in a time domain to the one or more selected subcarriers for the signal 205. For example, the base station 105-*a* may for each of the one or more selected subcarriers for the signal 205 multiply information (e.g., data) of one or more temporally adjacent conjugate subcarriers. In some examples, as part of DPSK modulation, portions of the signal 205 may be used as a reference, and thereby eliminating demand for an additional reference signal. As a result, the UE 115-*a* may use less resources for processing the signal 205, and as a result experience power saving.

The base station 105-*a* may increase a reliability of the DPSK modulation by providing a repetition (e.g., symbol period repetition) for the signal 205. The signal 205 may be defined by $z_k$, given by a multiplication of subcarrier $y_k$ with a conjugate of an adjacent subcarrier $y_{k-1}^*$:

$$x_k = x_{k-1} s_k,$$
$$k \geq 0$$
$$x_{-1} = 1$$
$$z_k = y_k y_{k-1}^* = (h_k x_k + v_k)(h_{k-1} x_{k-1} + v_{k-1})^* =$$
$$(h_k s_k x_{k-1} + v_k)(h_{k-1} x_{k-1} + v_{k-1})^* \approx (h_k s_k x_{k-1} + v_k)(h_k x_{k-1} + v_{k-1})^* =$$
$$|h_k|^2 |x_{k-1}|^2 s_k + v_k h_k^* x_{k-1}^* + v_{k-1}^* h_k s_k x_{k-1} + v_k v_{k-1}^*$$

where $x_k$ represents a modulated signal, $s_k$ represents a data symbol, $h_k$ represents a channel, and $v_k$ represents noise. Channel values for adjacent subcarriers may be approximately equal (e.g., $h_k$ $h_{k-1}$). In DPSK modulation, the data symbol $s_k$ may be multiplied by an adjacent subcarrier $x_{R \cdot k-1}$ (e.g., a temporally adjacent subcarrier). In some examples, because the data is associated with a phase of $s_k$, a simple demodulator may be given by:

$$\hat{m} = \mathrm{argmin}_m \{ | \measuredangle z_k - \theta_m |^2 \}$$
$$\hat{s}_k = e^{j\theta \hat{m}}$$

Multiplying adjacent subcarriers during modulation may also multiply or amplify the noise $v_k$ associated with the adjacent subcarriers (e.g., $v_k v_{k-1}^*$, squared noise), and thereby influencing processing of the signal 205.

To reduce adverse effects of the amplified noise, the base station 105-*a* may be configured to increase an SNR or a gain, or both, of the signal 205, for example, by transmitting the signal 205 using a number of repetitions configured by a repetition factor R. The base station 105-*a* may process information bits, such as channel coding and rate matching the information bits. The base station 105-*a* may map, via resource element mapper, the coded rate matched bits based on a repetition factor R. For example, the base station 105-*a* may map the coded rate matched bits to one or more subcarriers of a resource block 210 based on the repetition factor. In some examples, the rate of rate matching the information bits may be scaled based on the repetition factor.

For example, for a repetition factor of R=2, the resource element mapper output may be given by:

$$x_{2k} = x_{2k-1} s_{2k}, 2k \geq 0$$
$$x_{2k+1} = x_{2k} s_{2k}$$
$$x_{-1} = 1$$

where $s_{2k}$ represents the data symbol and $x_{2k}$ represents the modulated signal associated with a given repetition factor. The data symbol $s_k$ is multiplied by an adjacent subcarrier $x_{R \cdot k-1}$ (e.g., a temporally adjacent subcarrier). In some cases, applying the repetition may scale the encoding rate by the repetition factor. Applying the repetition may also reduce the number of subcarriers used to transmit the signal 205. In some examples, a size of the resource block 210 may not change after repetition is applied but data may be repeated based on the repetition factor and the mapping. The base station 105-*a* may transmit a same number of bits to the UE 115-*a*, but in some cases the repetition may increase the coding rate. The base station 105-*a* may thus generate the signal (e.g., an orthogonal frequency division multiplexed (OFDM) signal) based on the repetition factor, where the signal 205 includes repeated subcarriers on resource block 210.

The repetition factor R may be configured according to various factors. The repetition factor may be an integer value (e.g., in cases where a corresponding coding rate is smaller than 1). The repetition factor may be predefined or configured according to various aspects in a lookup table. In some examples, the repetition factor may be configured according to a modulation and coding scheme (MCS) value (e.g., where each MCS may have associated repetition factors). In some other cases, the repetition factor may be configured according to a constellation used for mapping the data bits (e.g., BPK, QPSK, DPSK, etc.), or for a given frequency allocation of the signal 205. In addition, the repetition factor may be configured according to certain channel conditions (e.g., a delay spread, a Doppler spread, a time offset, etc.) or other factors.

The base station 105-*a* may also be configured to convey repetition factor information to the UE 115-*a* in a control message, such as in downlink control information (DCI) message. Alternatively or additionally, the UE 115-*a* may be configured with a lookup table, which the UE 115-*a* may use to identify a repetition factor. In some examples, the base station 105-*a* may be configured to transmit an RRC connection establishment message including a set of parameters indicating the repetition factor per MCS. The UE 115-*a* may receive the RRC connection establishment message including the set of parameters indicating the repetition factor per MCS. This may reduce the DCI overhead in the price of less flexibility. That is, in some cases, the default configuration desired repetition may be changed during time according to a delay spread or a Doppler spread. As such, the base station 105-*a* may transmit, and the UE 115-*a* may receive, the DCI including the repetition factor. In some cases where the channel doesn't change rapidly the base station 105-*a* may transmit a vector of repetition factors per MCS which can be changed by RRC or MCA-CE messages.

The UE 115-*a* may receive the signal 205 from the base station 105-*a*. In some examples, the UE 115-*a* may be configured to average data received according to the repetition factor R. For example, the UE 115-*a* may be configured to average repeated samples received in the signal 205 from the base station 105-a. In some examples, the UE 115-a may identify adjacent subcarriers containing repeated data according to the repetition factor, and may average the value of the adjacent subcarriers. The UE 115-a may input the averaged values to a demodulator, which may demodulate the symbols and estimate the transmitted data bits according to the mapping. The UE 115-a may also implement various error checking schemes or may utilize iterative decoding to increase the reliability of the received data.

The base station 105-a and the UE 115-a may, as a result, include features for improvements to wireless communications between the base station 105-a and the UE 115-a and, in some examples, may promote enhanced efficiency for high reliability and low latency wireless communications in 5G systems, among other benefits. Although aspects of transmitting the signal 205 were described from the perspective of the base station 105-a, the UE 115-a may be configured to perform same or similar operations (or configured with same or similar components) for transmitting the signal 205. Likewise, although aspects of receiving the signal 205 were described from the perspective of the UE 115-a, the base station 105-a may be configured to perform same or similar operations (or configured with same or similar components) for receiving the signal 205.

Figures 3A, 3B:
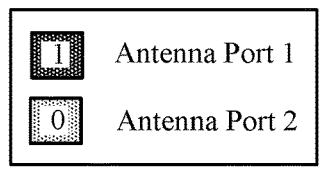
FIGS. 3A and 3B illustrate examples of resource block configurations that support repetition on subcarriers for noncoherent modulation in accordance with aspects of the present disclosure.

FIG. 3A illustrates an example of a resource block configuration 300-a that supports repetition on subcarriers for noncoherent modulation in accordance with aspects of the present disclosure. The resource block configuration 300-a may implement or be implemented by aspects of the wireless communications systems 100 and 200 or may implement aspects of the wireless communications systems 100 and 200 as described with reference to FIGS. 1 and 2, respectively. For example, the resource block configuration 300-a may be based on a configuration provided by a base station 105 and implemented by the base station 105 or a UE 115, or both. The base station 105 or the UE 115, or both, may support wireless communications using the resource block configuration 300-a. For example, the base station 105 or the UE 115, or both, map information (e.g., control, data) for wireless communications according to the resource block configuration 300-a.

In the example of FIG. 3A, the resource block configuration 300-a may correspond to a coherent modulation resource block mapped according to a reference signal. The base station 105 or the UE 115, or both, may map subcarriers $s_{00}$, $s_{01}$, $s_{10}$, $s_{11}$, and $s_{30}$ to various locations 305, 310, and 315 of a resource block according to a coherent modulation. Each antenna port (e.g., antenna port 1 and antenna port 2) may be associated with a unique cell-specific reference signal. The resource elements of the resource block may be arranged based on the cell-specific reference signals and based on the antenna port arrangement. To mitigate impact of amplified noise on a signal, the base station 105 or the UE 115, or both, may provide repetition on subcarriers $s_0$, $s_{01}$, $s_{10}$, $s_{11}$, and $s_{30}$ to various locations 305, 310, and 315 of a resource block for noncoherent modulation.

FIG. 3B illustrates an example of a resource block configuration 300-b that supports repetition on subcarriers for noncoherent modulation in accordance with aspects of the present disclosure. The resource block configuration 300-b may implement aspects of the wireless communications systems 100 and 200 or may implement or be implemented by aspects of the wireless communications systems 100 and 200 as described with reference to FIGS. 1 and 2, respectively. For example, the resource block configuration 300-b may be based on a configuration provided by a base station 105 and implemented by the base station 105 or a UE 115, or both. The base station 105 or the UE 115, or both, may support wireless communications using the resource block configuration 300-b. For example, the base station 105 or the UE 115, or both, map information (e.g., control, data) for wireless communications according to the resource block configuration 300-b.

In the example of FIG. 3B, the resource block configuration 300-b may correspond to noncoherent modulation. The base station 105 or the UE 115, or both, may map one or more subcarriers to resource elements in a resource block. For example, according to the resource block configuration 300-b, a first location 305 (e.g., row in the resource block) may include known data (e.g., 1). A second location 310 may include subcarriers $s_{10}$ and $s_{11}$ according to a mapping. A third location 315 may include mapped data subcarriers, where adjacent subcarriers are multiplied according to the mapping configuration (e.g., $s_{10}*s_{11}$ and $s_{11}*s_{21}$). A fourth location 320 may include additional mapped data subcarriers, where adjacent subcarriers are multiplied according to the mapping configuration (e.g., $s_{10}*s_{20}*s_{30}$ and $s_{11}*s_{21}*s_{31}$). In some examples, the base station 105 or the UE 115, or both, may map data to resource elements in the resource block, and each operation may be repeated according to a repetition rate. For example, the base station 105 or the UE 115, or both, may map data to the resource block according to a repetition factor of R=2, where each row is repeated twice.

For example, a first row may include known data (e.g., 1) and may be repeated according to a first repetition. A second row may include a first mapped subcarrier and a second mapped subcarrier ($s_{10}$ and $s_{11}$) and may be repeated according to a second repetition. A third row may include two multiplied adjacent subcarriers and may be repeated according to a third repetition ($s_{10}*s_{20}$). An addition repetition may include further multiplication of adjacent subcarriers ($s_{10}*s_{20}*s_{30}$). Therefore, the base station 105 or the UE 115, or both, may be configured to use adjacent subcarriers in the resource block for wireless communications of signals, and the adjacent subcarriers may use a same communication channel. To mitigate impact of amplified noise on a signal, the base station 105 or the UE 115, or both, may provide repetition on subcarriers $s_{00}$, $s_{01}$, $s_{10}$, $s_{11}$, and $s_{30}$ of a resource block for noncoherent modulation.

Figure 4:
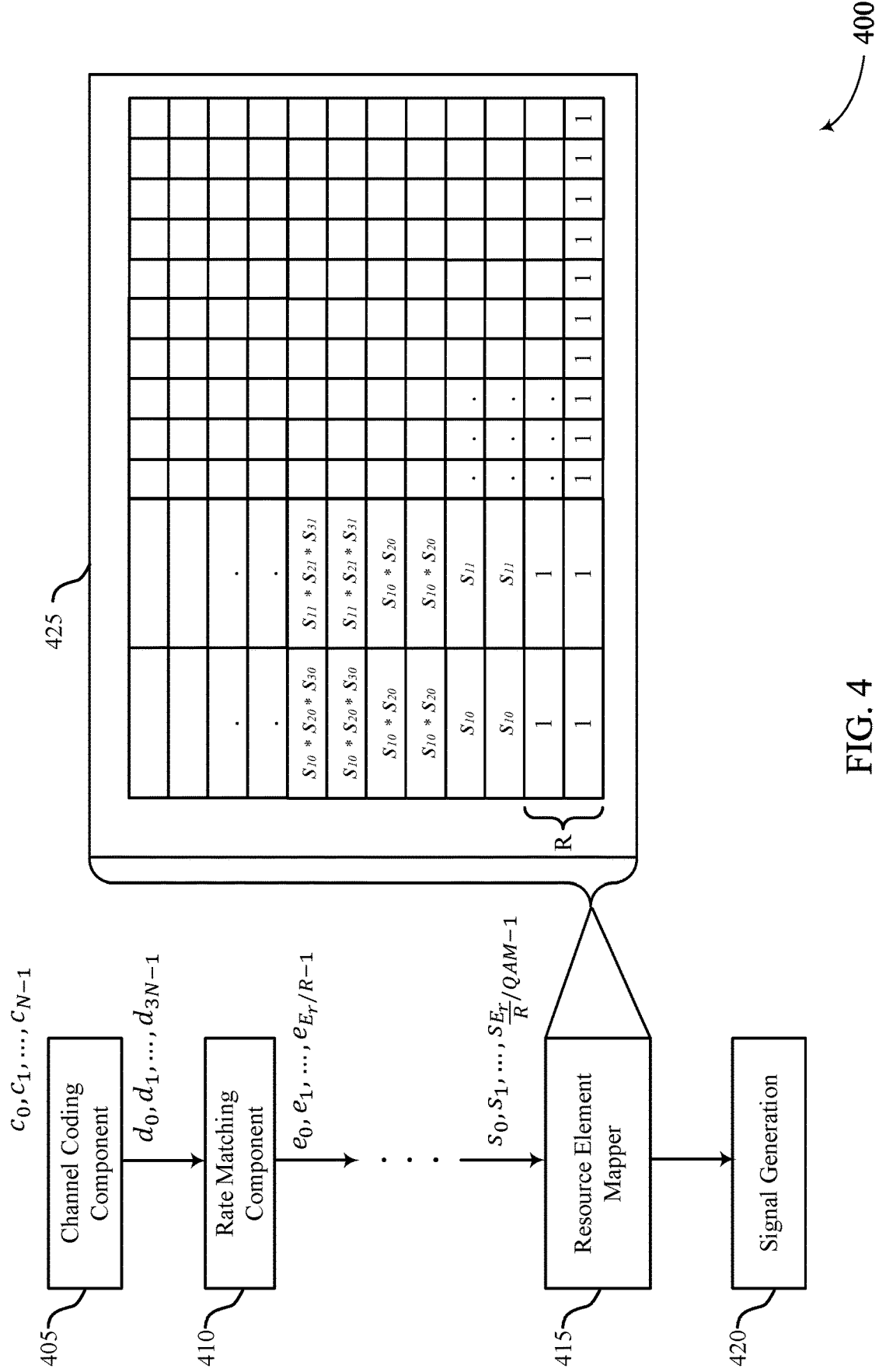
FIGS. 4 and 5 illustrate example of methods that support repetition on subcarriers for noncoherent modulation in accordance with aspects of the present disclosure.

FIG. 4 illustrates an example of a method 400 that supports repetition on subcarriers for noncoherent modulation in accordance with aspects of the present disclosure. The method 400 may implement or be implemented by aspects of the wireless communications systems 100 and 200 or may implement aspects of the wireless communications systems 100 and 200 as described with reference to FIGS. 1 and 2, respectively. For example, the operations of the method 400 may be implemented by a transmitting device (e.g., a base station 105, a UE 115) or its components as described herein. For example, the operations of the method 400 may be performed by a communications manager as described with reference to FIGS. 6 through 9. In some examples, a transmitting device (e.g., a base station 105, a UE 115) may execute a set of instructions to control the functional elements of the device to perform the functions described below. Additionally or alternatively, a transmitting device (e.g., a base station 105, a UE 115) may perform aspects of the functions described below using special-purpose hardware.

A transmitting device may support increasing an SNR or a gain, or both, for signal repetition. The transmitting device may be configured with a resource element mapper, which may map information bits (e.g., data bits) associated with one or more subcarriers to adjacent conjugate subcarriers based on a repetition factor R. The resource element mapper may be implemented in hardware, code (e.g., software or firmware) executed by a processor, or any combination thereof. If implemented in code executed by a processor, the functions of the resource element mapper may be executed by a general-purpose processor, a DSP, an ASIC, a FPGA or other programmable logic device, discrete gate or transistor logic, discrete hardware components, or any combination thereof designed to perform the functions described in the present disclosure.

The repetition factor may be predefined. The resource element mapper may map the information bits (e.g., data bits) to one or more subcarriers of a resource block to increase a signal gain. The transmitting device may also scale a rate of rate matching the information bits (e.g., data bits) based on the repetition factor. For example, for R=2, the transmitting device may use half of the original subcarriers to transmit the information bits (e.g., data bits). In such examples, a size of resource block might not change and a total number of information bits (e.g., data bits) may be the same, which may increase a rate according to the repetition factor used (e.g., the rate may be twice what it was before the repetition).

At 405, the transmitting device may encode, at a channel coding component, information bits $c_0, c_1, \ldots, c_{N-1}$, where N is a total number of information bits. In some examples, the transmitting device may encode the information bits based on a repetition factor R to generate encoded bits $d_0, d_1, \ldots, d_{3N-1}$. The channel coding component may be implemented in hardware, code (e.g., software or firmware) executed by a processor, or any combination thereof. If implemented in code executed by a processor, the functions of the channel coding component may be executed by a general-purpose processor, a DSP, an ASIC, a FPGA or other programmable logic device, discrete gate or transistor logic, discrete hardware components, or any combination thereof designed to perform the functions described in the present disclosure.

At 410, the transmitting device may rate match, via a rate matching component, the encoded bits $d_0, d_1, \ldots, d_{3N-1}$. The rate matching component may be implemented in hardware, code (e.g., software or firmware) executed by a processor, or any combination thereof. If implemented in code executed by a processor, the functions of the rate matching component may be executed by a general-purpose processor, a DSP, an ASIC, a FPGA or other programmable logic device, discrete gate or transistor logic, discrete hardware components, or any combination thereof designed to perform the functions described in the present disclosure. In some examples, the channel coding component may perform a 1/3 rate encoding. For example, for every single information bit, the channel coding component may generate three encoded bits. During rate matching, the bits are rate matched according to a coding rate $E_r$, which may be scaled by the repetition factor R. For example, the coding rate for the input bits may be scaled by $E_r/R-1$. After rate matching, the bits may be denoted $e_0, e_1, \ldots e_{E_r}/R-1$. The repetition factor may be applied to the rate matched bits, and the rate matched bits (denoted $f_0, f_1, \ldots, f_{G-1}$, where G is the total number of coded bits) may be input to the resource element mapper at 415.

At 415, the transmitting device may, via the resource mapper, map the bits to subcarriers according to the repetition factor R. The resource mapper may be implemented in hardware, code (e.g., software or firmware) executed by a processor, or any combination thereof. If implemented in code executed by a processor, the functions of the resource mapper may be executed by a general-purpose processor, a DSP, an ASIC, a FPGA or other programmable logic device, discrete gate or transistor logic, discrete hardware components, or any combination thereof designed to perform the functions described in the present disclosure. By way of example, for a repetition factor of R=2, the resource element mapper may map two repetitions of the data onto subcarriers in a resource block 425. For example, a first row may include known data (e.g., 1) and may be repeated according to a first repetition. A second row may include a first mapped subcarrier and a second mapped subcarrier ($s_{10}$ and $s_{11}$) and may be repeated according to a second repetition. A third row may include two multiplied adjacent subcarriers and may be repeated according to a third repetition ($s_{10}*s_{20}$). An additional repetition may include further multiplication of adjacent subcarriers ($s_{10}*s_{20}*s_{30}$). The subcarriers $s_0, s_1, \ldots,$ $$S_{\frac{E_r}{R}/QAM-1}$$

may be mapped to the resource block 425, as described herein. At 420, the transmitting device may generate an OFDM signal based on the mapping, where the OFDM signal carries the data repeated according to the repetition factor.

Figure 5:
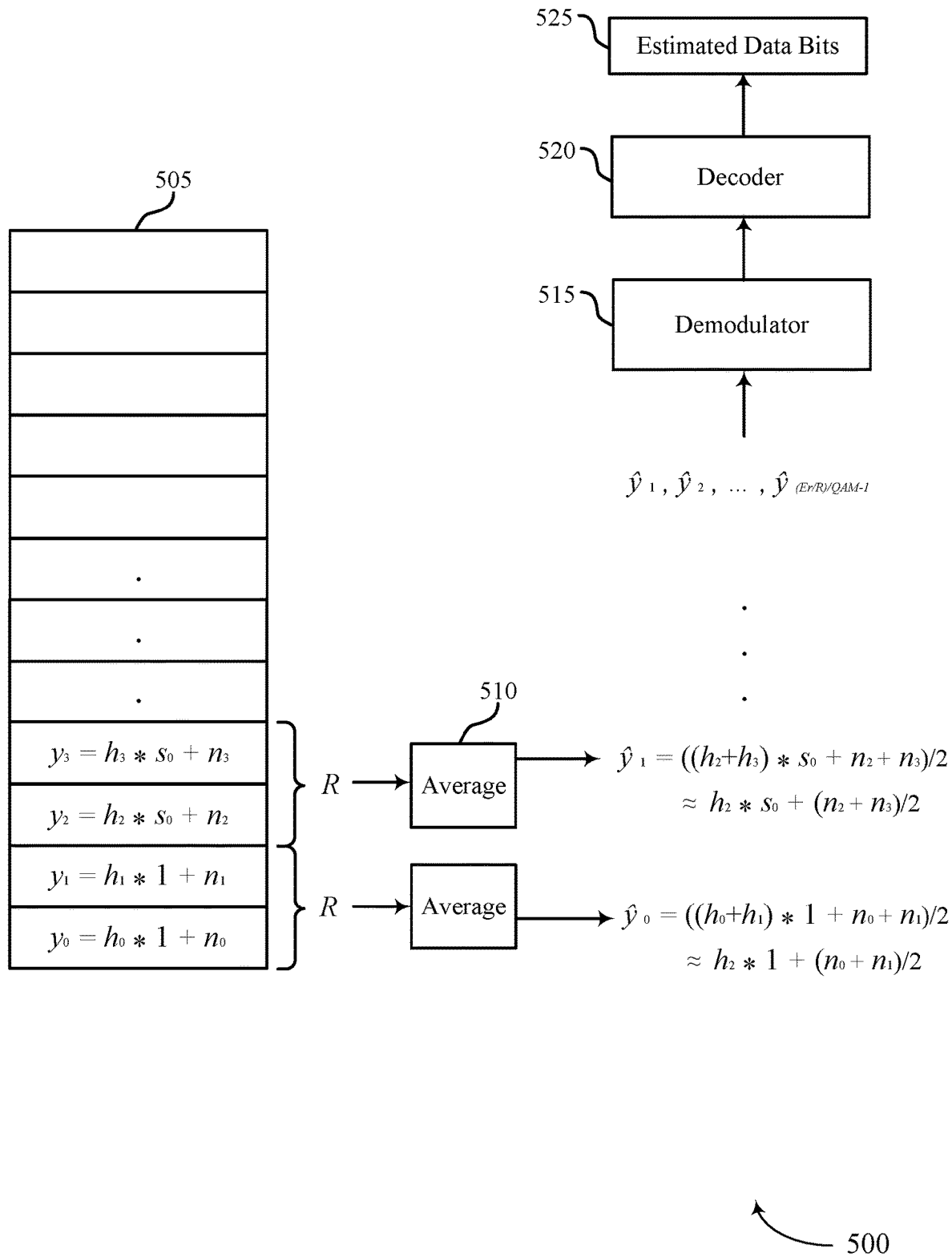

FIG. 5 illustrates an example of a method 500 that supports repetition on subcarriers for noncoherent modulation in accordance with aspects of the present disclosure. The method 500 may implement or be implemented by aspects of the wireless communications systems 100 and 200 or may implement aspects of the wireless communications systems 100 and 200 as described with reference to FIGS. 1 and 2, respectively. For example, the operations of the method 500 may be implemented by a receiving device (e.g., a base station 105, a UE 115) or its components as described herein. For example, the operations of the method 500 may be performed by a communications manager as described with reference to FIGS. 6 through 9. In some examples, a receiving device (e.g., a base station 105, a UE 115) may execute a set of instructions to control the functional elements of the device to perform the functions described below. Additionally or alternatively, a receiving device (e.g., a base station 105, a UE 115) may perform aspects of the functions described below using special-purpose hardware.

A receiving device may be configured to average received data symbols based on a repetition factor R. For example, the receiving device may receive information 505 (e.g., input symbols) from a transmitting device according to the repetition factor. For example, the receiving device may receive a first repetition including samples $y_1=h_1*1+n_1$ and $y_0=h_0*1+n_0$, and may average, at 510, the samples to obtain an average $\hat{y}_0$ according to the repetition factor. The receiving device may further receive a second repetition including samples $y_3=h_3*s_0+n_3$ and $y_2=h_2*s_0+n_2$, and may average the samples to obtain an average $\hat{y}_1$ according to the repetition factor. The receiving device may average samples according to the repetition factor (e.g., if the repetition factor is R=n, the receiving device may determine the average of the n received samples).

At 515, the receiving device may, via a demodulator, demodulate the symbols $\hat{y}_1, \hat{y}_2, \ldots,$ $\hat{y}_{\frac{Er}{R}/QAM-1}$ (identified by the averaging) into a subset including data subcarriers $\hat{s}_0, \hat{s}_1, \ldots,$ $\hat{s}_{\frac{Er}{R}/QAM-1}.$ In some cases, the demodulator may multiply adjacent subcarriers and may output an estimation of the signal. The demodulator may be implemented in hardware, code (e.g., software or firmware) executed by a processor, or any combination thereof. If implemented in code executed by a processor, the functions of the demodulator may be executed by a general-purpose processor, a DSP, an ASIC, a FPGA or other programmable logic device, discrete gate or transistor logic, discrete hardware components, or any combination thereof designed to perform the functions described in the present disclosure.

At 520, the receiving device may, via a decoder, decode the demodulated data subcarriers, which may estimate the received data bits at 525. The decoder may be implemented in hardware, code (e.g., software or firmware) executed by a processor, or any combination thereof. If implemented in code executed by a processor, the functions of the decoder may be executed by a general-purpose processor, a DSP, an ASIC, a FPGA or other programmable logic device, discrete gate or transistor logic, discrete hardware components, or any combination thereof designed to perform the functions described in the present disclosure. In some cases, the receiving device may implement an iterative decoding process based on an error checking process, for example a cyclic redundancy check procedure.

Figure 6:
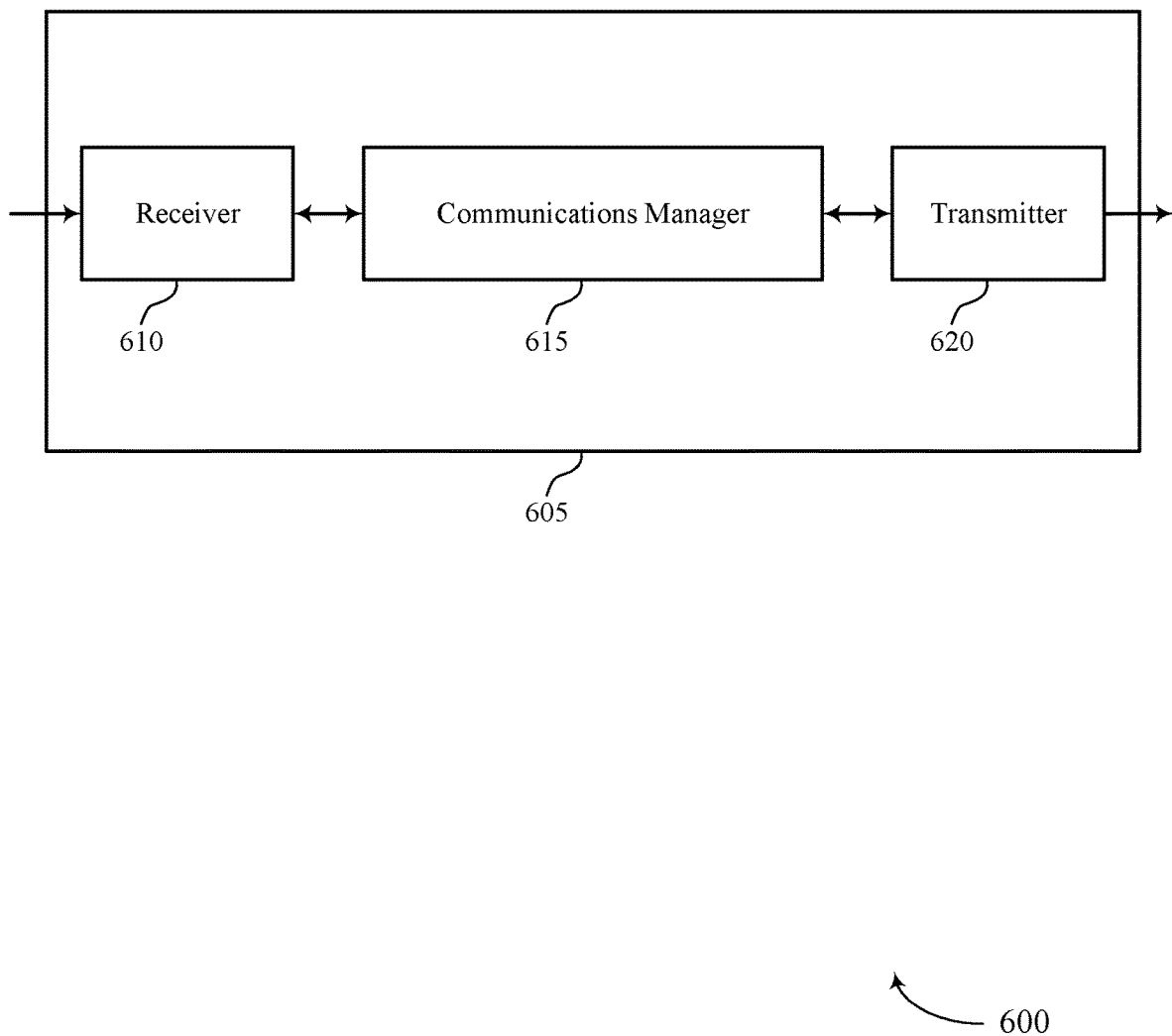
FIGS. 6 and 7 show block diagrams of devices that support repetition on subcarriers for noncoherent modulation in accordance with aspects of the present disclosure.

FIG. 6 shows a block diagram 600 of a device 605 that supports repetition on subcarriers for noncoherent modulation in accordance with aspects of the present disclosure. The device 605 may be an example of aspects of a device as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to repetition on subcarriers for noncoherent modulation, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may encode a set of bits to transmit to a receiving device based on a repetition factor. The communications manager 615 may map, based on the repetition factor, the set of encoded bits to a subset of subcarriers including adjacent subcarriers of a set of subcarriers. The communications manager 615 may generate a signal including the set of encoded bits based on the mapping, and transmit the generated signal to the receiving device.

The communications manager 615 may receive a modulated signal from a transmitting device. The communications manager 615 may identify, based on a repetition factor, a subset of subcarriers including adjacent subcarriers of a set of subcarriers associated with the modulated signal. The communications manager 615 may average the subset of subcarriers including the adjacent subcarriers. The communications manager 615 may demodulate the modulated signal in accordance with the averaged subset of subcarriers including the adjacent subcarriers. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

The communications manager 615 may be implemented as an integrated circuit or chipset for a mobile device modem, and the receiver 610 and the transmitter 620 may be implemented as analog components (e.g., amplifiers, filters, antennas, etc.) coupled with the mobile device modem to enable wireless transmission and reception. The communications manager 615 as described herein may be implemented to realize one or more potential advantages. Various implementations may enable implementing increased SNR by signal repetition. At least one implementation may enable the communications manager 615 to effectively implement repetition to a number of mapped subcarriers of a transmitted signal, and include a number of silent subcarriers to maintain a total energy of the transmitted signal. At least one implementation may enable the communications manager 615 to map repeated data to a resource block to increase signal gain. Based on implementing the signal repetition techniques as described herein, one or more processors of the device 605 (e.g., processor(s) controlling or incorporated with one or more of the receiver 610, the communications manager 615, and the transmitter 620) may increase the SNR and gain of the transmitted signal.

Figure 7:
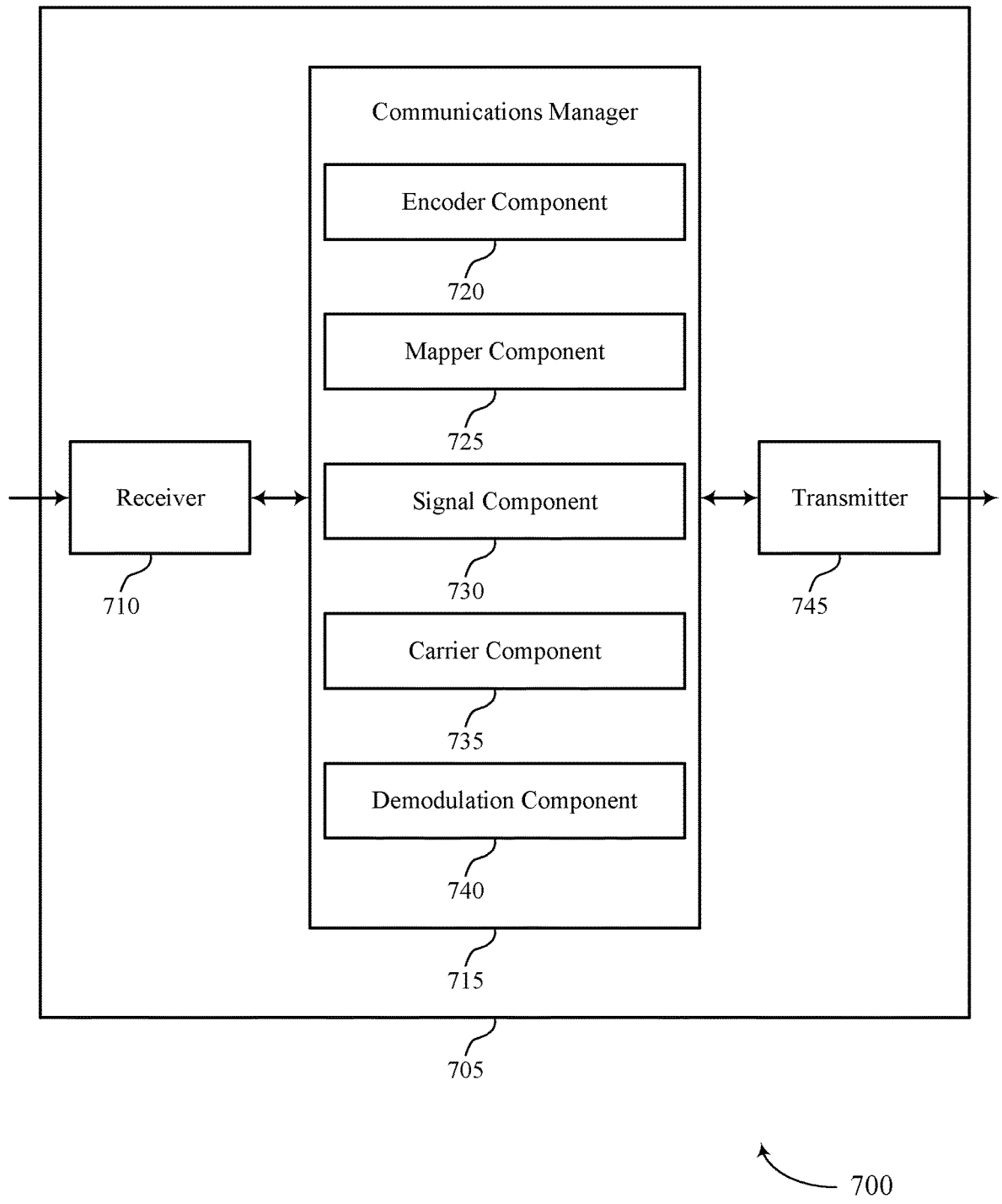

FIG. 7 shows a block diagram 700 of a device 705 that supports repetition on subcarriers for noncoherent modulation in accordance with aspects of the present disclosure.

The device 705 may be an example of aspects of a device 605 or a device 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to repetition on subcarriers for noncoherent modulation, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an encoder component 720, a mapper component 725, a signal component 730, a carrier component 735, and a demodulation component 740. The communications manager 715 may be an example of aspects of the communications manager 910 described herein.

The encoder component 720 may encode a set of bits to transmit to a receiving device based on a repetition factor. The mapper component 725 may map, based on the repetition factor, the set of encoded bits to a subset of subcarriers including adjacent subcarriers of a set of subcarriers. The signal component 730 may generate a signal including the set of encoded bits based on the mapping and transmit the generated signal to the receiving device.

The signal component 730 may receive a modulated signal from a transmitting device. The carrier component 735 may identify, based on a repetition factor, a subset of sub carriers including adjacent subcarriers of a set of subcarriers associated with the modulated signal and average the subset of subcarriers including the adjacent subcarriers. The demodulation component 740 may demodulate the modulated signal in accordance with the averaged subset of subcarriers including the adjacent subcarriers.

The transmitter 745 may transmit signals generated by other components of the device 705. In some examples, the transmitter 745 may be collocated with a receiver 710 in a transceiver component. For example, the transmitter 745 may be an example of aspects of the transceiver 920 described with reference to FIG. 9. The transmitter 745 may utilize a single antenna or a set of antennas.

Figure 8:
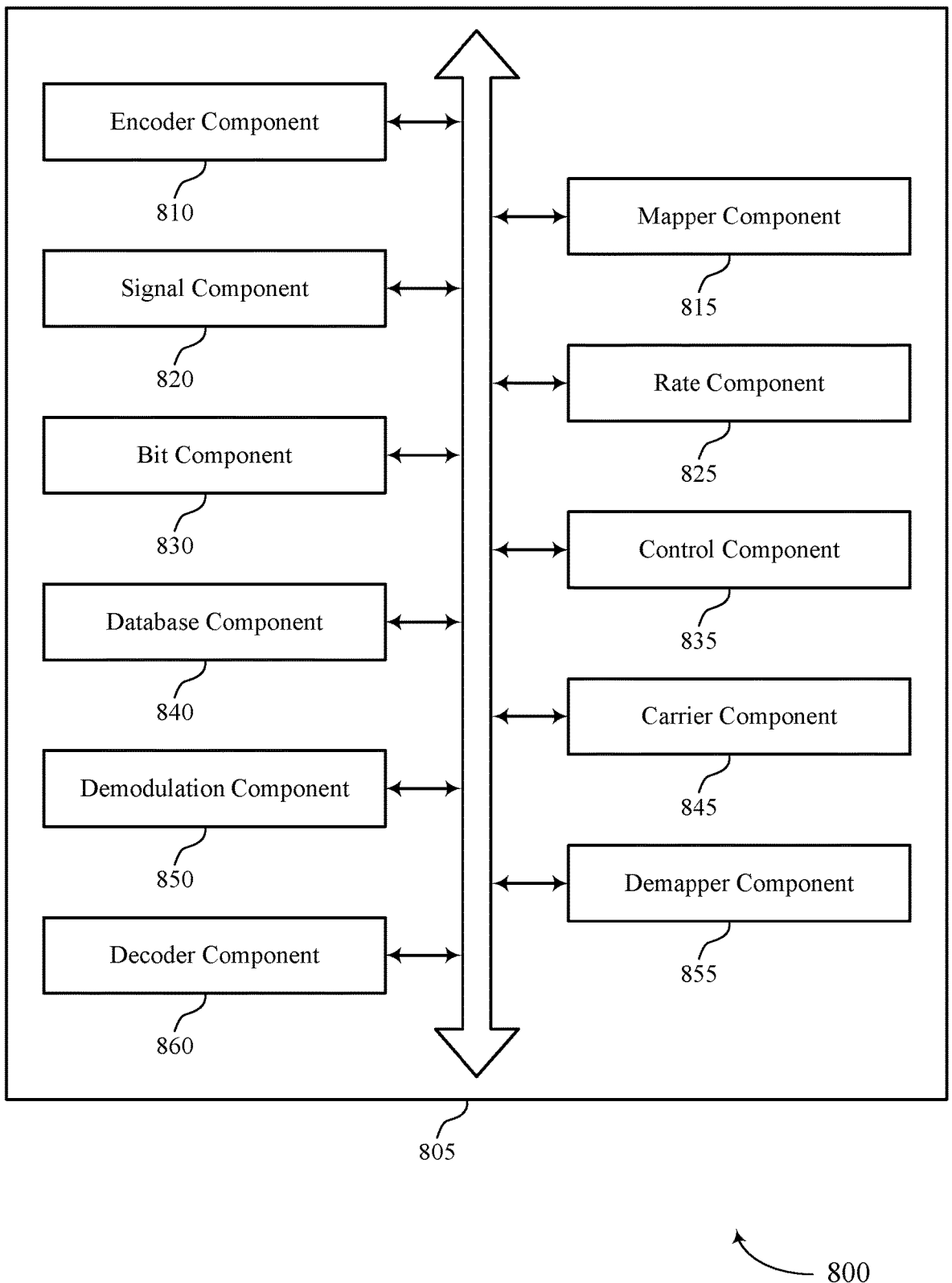
FIG. 8 shows a block diagram of a communications manager that supports repetition on subcarriers for noncoherent modulation in accordance with aspects of the present disclosure.

FIG. 8 shows a block diagram 800 of a communications manager 805 that supports repetition on subcarriers for noncoherent modulation in accordance with aspects of the present disclosure. The communications manager 805 may be an example of aspects of a communications manager 615, a communications manager 715, or a communications manager 910 described herein. The communications manager 805 may include an encoder component 810, a mapper component 815, a signal component 820, a rate component 825, a bit component 830, a control component 835, a database component 840, a carrier component 845, a demodulation component 850, a demapper component 855, and a decoder component 860. Each of these components may communicate, directly or indirectly, with one another (e.g., via one or more buses).

The encoder component 810 may encode a set of bits to transmit to a receiving device based on a repetition factor. In some cases, a value of the repetition factor is based on an MCS value, a constellation mapping configuration, a frequency allocation parameter, or a channel condition, or any combination thereof. The mapper component 815 may map, based on the repetition factor, the set of encoded bits to a subset of subcarriers including adjacent subcarriers of a set of subcarriers. In some examples, the mapper component 815 may identify a set of data bits associated with the set of encoded bits. In some examples, the mapper component 815 may recursively map, based on the repetition factor, the set of data bits to the subset of subcarriers including the adjacent subcarriers. The encoder component 810 may transmit an RRC connection establishment message including a set of parameters indicating the repetition factor per MCS.

In some examples, the mapper component 815 may map a first subset of data bits associated with the set of data bits to a first subset of adjacent subcarriers. In some examples, the mapper component 815 may map a second subset of data bits associated with the set of data bits to a second subset of adjacent subcarriers based on the repetition factor. In some examples, the mapper component 815 may map the subset of subcarriers including the adjacent subcarriers to a resource block based on the repetition factor. In some examples, the mapper component 815 may generate the signal based on mapping the subset of subcarriers to the resource block. In some cases, the mapping includes a non-coherent modulation mapping.

The signal component 820 may generate a signal including the set of encoded bits based on the mapping. In some examples, the signal component 820 may transmit the generated signal to the receiving device. In some examples, the signal component 820 may receive a modulated signal from a transmitting device. The carrier component 845 may identify, based on a repetition factor, a subset of subcarriers including adjacent subcarriers of a set of subcarriers associated with the modulated signal. In some examples, the carrier component 845 may average the subset of subcarriers including the adjacent subcarriers. In some examples, the carrier component 845 may average data samples of the subset of subcarriers including the adjacent subcarriers, where demodulating the modulated signal is based on averaging the data samples of the subset of subcarriers including the adjacent subcarriers. In some examples, the carrier component 845 may average the data samples of the subset of subcarriers including the adjacent subcarriers based on a coherent combination of the data samples. In some cases, the subset of subcarriers includes repeated data based on the repetition factor.

The demodulation component 850 may demodulate the modulated signal in accordance with the averaged subset of subcarriers including the adjacent subcarriers. The rate component 825 may rate matching the set of encoded bits based on the repetition factor. In some examples, the rate component 825 may increase a rate of the encoding based on the repetition factor. In some cases, the rate of the encoding includes a value less than one. The bit component 830 may identify the set of bits to transmit to the receiving device based on the repetition factor. The control component 835 may transmit a DCI message including an indication of the repetition factor. In some examples, the control component 835 may receive a DCI message including an indication of the repetition factor.

Figure 9:
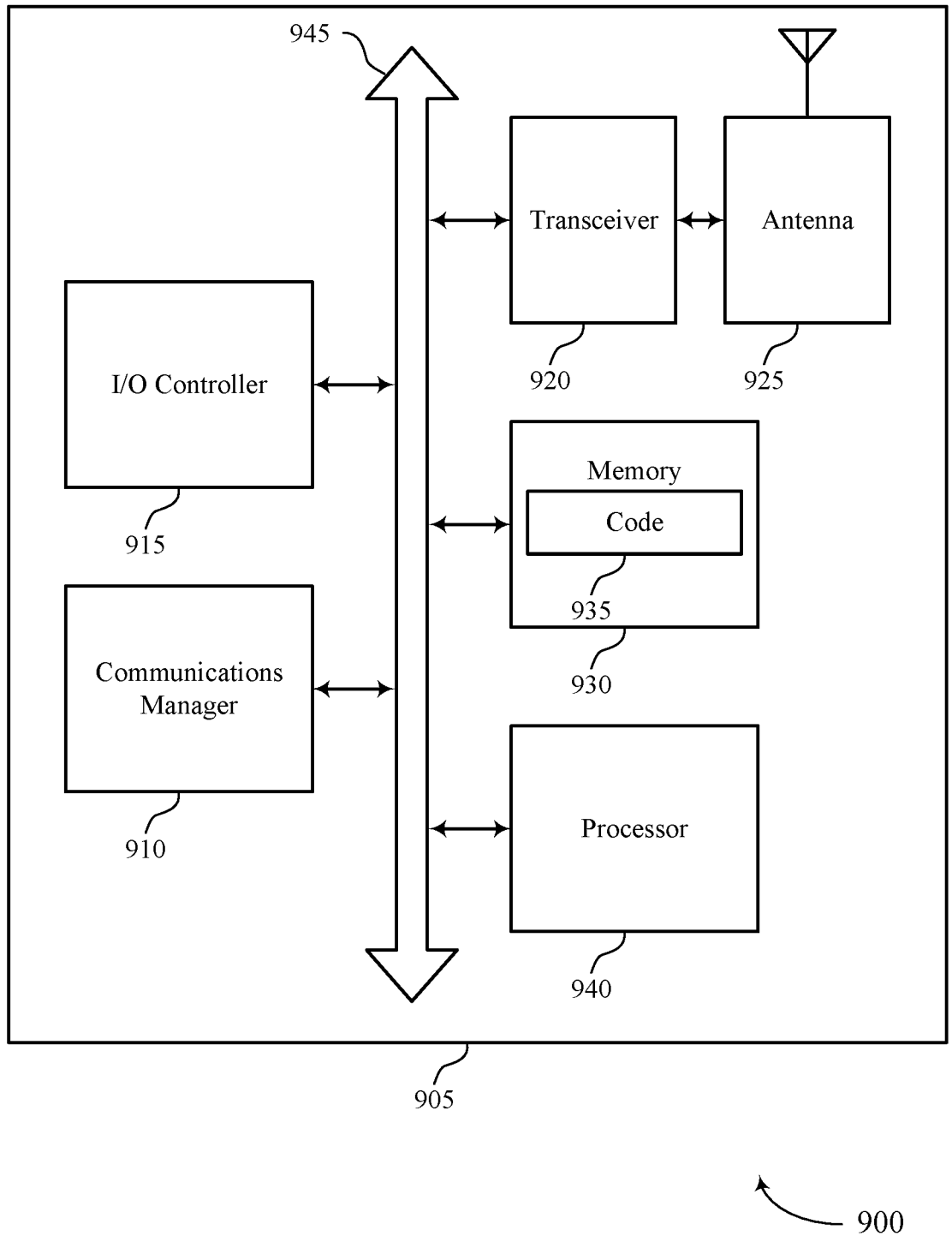
FIG. 9 shows a diagram of a system including a device that supports repetition on subcarriers for noncoherent modulation in accordance with aspects of the present disclosure.

The database component 840 may identify the repetition factor in a lookup table, where encoding the set of bits to transmit to the receiving device is based on identifying the repetition factor in the lookup table. In some examples, the database component 840 may identify the repetition factor in a lookup table. The demapper component 855 may demap the averaged subset of subcarriers including the adjacent subcarriers based on the repetition factor. The decoder component 860 may decode the averaged subset of subcarriers including the adjacent subcarriers to a set of modulated data bits based on the repetition factor. The decoder component 860 may receive an RRC connection establishment message including a set of parameters indicating the repetition factor per MCS FIG. 9 shows a diagram of a system 900 including a device 905 that supports repetition on subcarriers for noncoherent modulation in accordance with aspects of the present disclosure. The device 905 may be an example of or include the components of device 605, device 705, or a device as described herein. The device 905 may include components for bi-directional voice and data communications including components for transmitting and receiving communications, including a communications manager 910, an I/O controller 915, a transceiver 920, an antenna 925, memory 930, a processor 940, and a coding manager 950. These components may be in electronic communication via one or more buses (e.g., bus 945).

The communications manager 910 may encode a set of bits to transmit to a receiving device based on a repetition factor. The communications manager 910 may map, based on the repetition factor, the set of encoded bits to a subset of subcarriers including adjacent subcarriers of a set of subcarriers. The communications manager 910 may generate a signal including the set of encoded bits based on the mapping, and transmit the generated signal to the receiving device. Additionally or alternatively, the communications manager 910 may receive a modulated signal from a transmitting device. The communications manager 910 may identify, based on a repetition factor, a subset of subcarriers including adjacent subcarriers of a set of subcarriers associated with the modulated signal. The communications manager 910 may average the subset of subcarriers including the adjacent subcarriers, and demodulate the modulated signal in accordance with the averaged subset of subcarriers including the adjacent subcarriers. By including or configuring the communications manager 910 in accordance with examples as described herein, the device 905 may support techniques for improved communication reliability and reduced latency, among other benefits. For example, the device 905 may perform wireless communications with increased reliability based on using a repetition on subcarriers for noncoherent modulation.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases the device 905 may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting repetition on subcarriers for noncoherent modulation).

Figure 10:
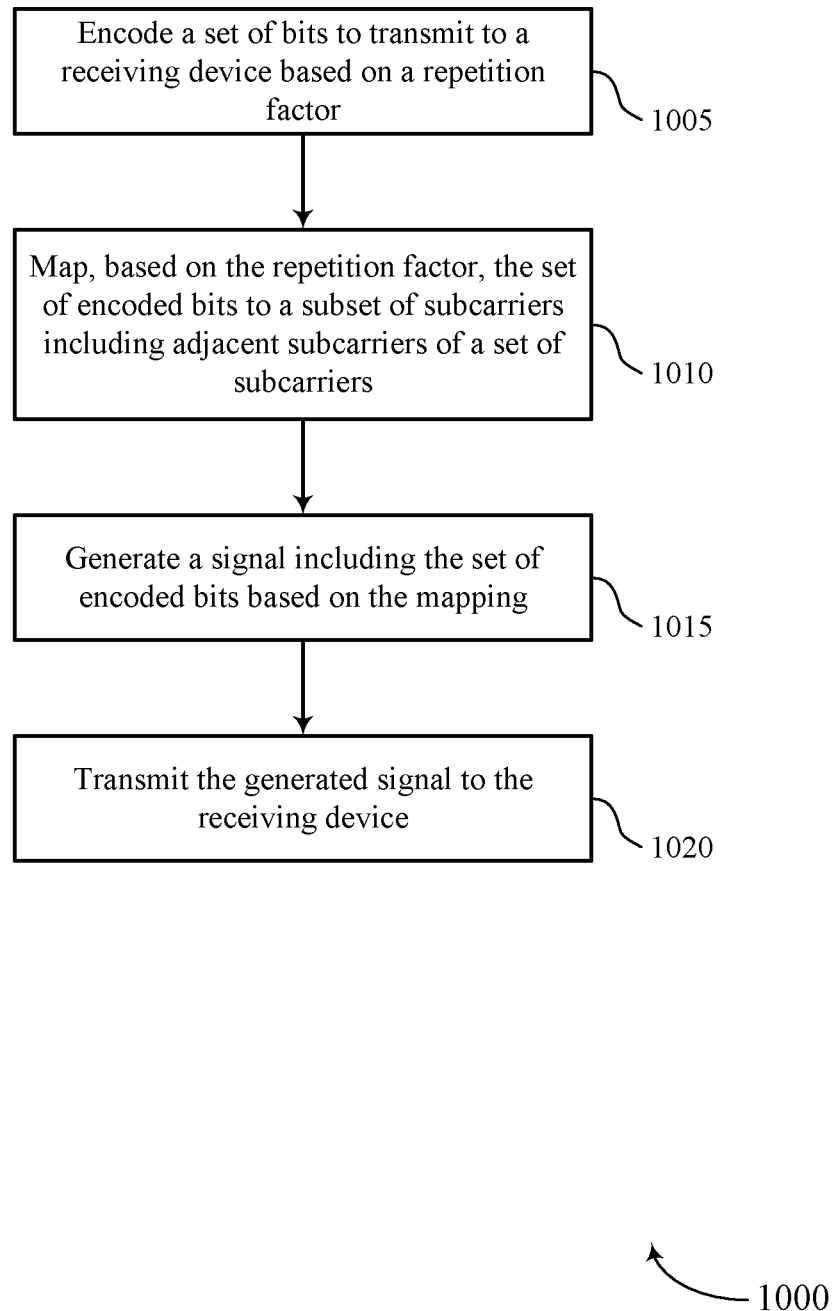
FIGS. 10 through 16 show flowcharts illustrating methods that support repetition on subcarriers for noncoherent modulation in accordance with aspects of the present disclosure.

FIG. 10 shows a flowchart illustrating a method 1000 that supports repetition on subcarriers for noncoherent modulation in accordance with aspects of the present disclosure. The operations of method 1000 may be implemented by a transmitting device (e.g., a base station 105, a UE 115) or its components as described herein. For example, the operations of method 1000 may be performed by a communications manager as described with reference to FIGS. 6 through 9. In some examples, a transmitting device (e.g., a base station 105, a UE 115) may execute a set of instructions to control the functional elements of the device to perform the functions described below. Additionally or alternatively, a transmitting device (e.g., a base station 105, a UE 115) may perform aspects of the functions described below using special-purpose hardware.

At 1005, a transmitting device may encode a set of bits to transmit to a receiving device based on a repetition factor. The operations of 1005 may be performed according to the methods described herein. In some examples, aspects of the operations of 1005 may be performed by an encoder component as described with reference to FIGS. 6 through 9.

At 1010, the transmitting device may map, based on the repetition factor, the set of encoded bits to a subset of subcarriers including adjacent subcarriers of a set of subcarriers. The operations of 1010 may be performed according to the methods described herein. In some examples, aspects of the operations of 1010 may be performed by a mapper component as described with reference to FIGS. 6 through 9.

At 1015, the transmitting device may generate a signal including the set of encoded bits based on the mapping. The operations of 1015 may be performed according to the methods described herein. In some examples, aspects of the operations of 1015 may be performed by a signal component as described with reference to FIGS. 6 through 9.

At 1020, the transmitting device may transmit the generated signal to the receiving device. The operations of 1020 may be performed according to the methods described herein. In some examples, aspects of the operations of 1020 may be performed by a signal component as described with reference to FIGS. 6 through 9.

Figure 11:
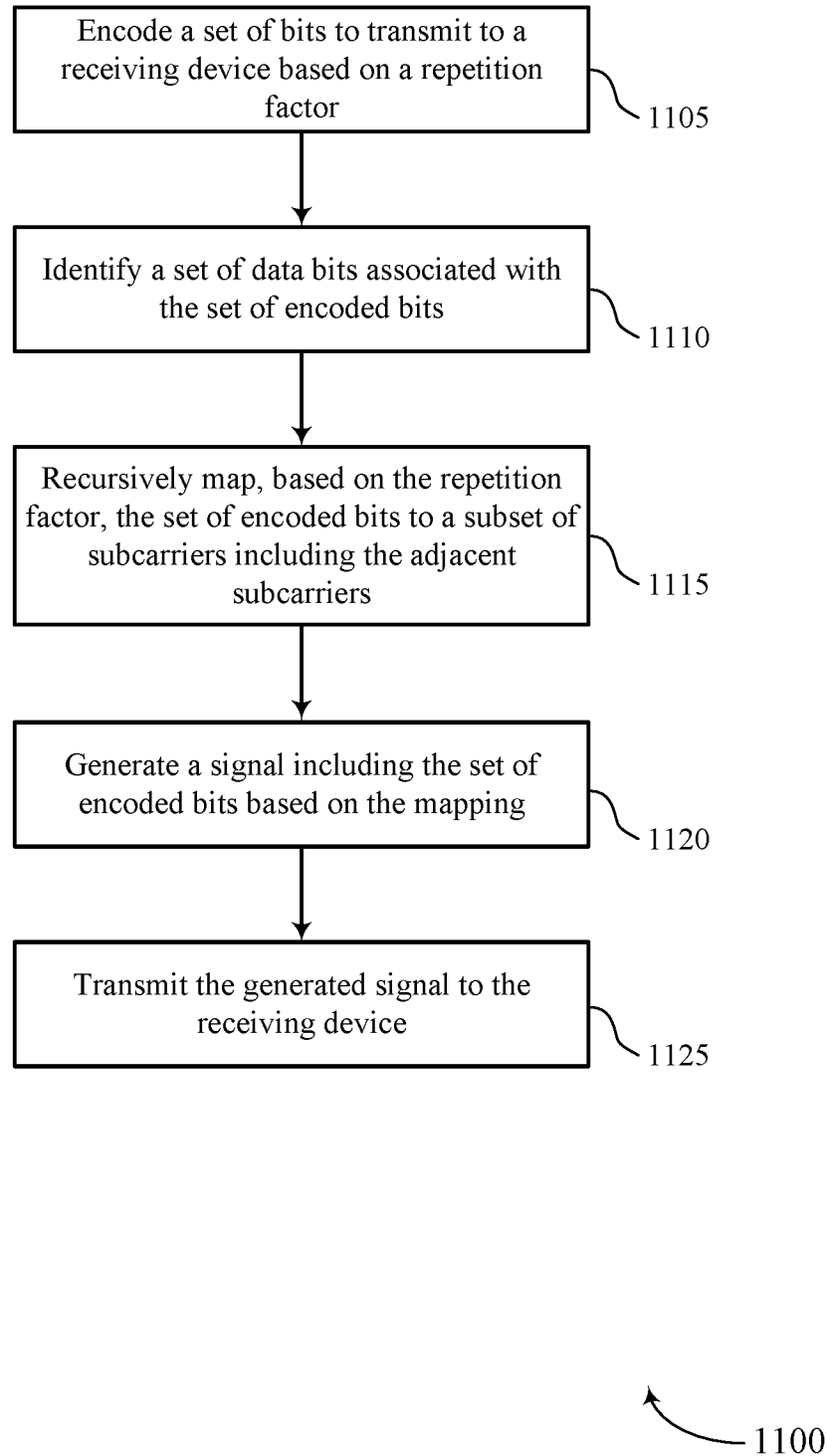

FIG. 11 shows a flowchart illustrating a method 1100 that supports repetition on subcarriers for noncoherent modulation in accordance with aspects of the present disclosure. The operations of method 1100 may be implemented by a transmitting device (e.g., a base station 105, a UE 115) or its components as described herein. For example, the operations of method 1100 may be performed by a communications manager as described with reference to FIGS. 6 through 9. In some examples, a transmitting device (e.g., a base station 105, a UE 115) may execute a set of instructions to control the functional elements of the device to perform the functions described below. Additionally or alternatively, a transmitting device (e.g., a base station 105, a UE 115) may perform aspects of the functions described below using special-purpose hardware.

At 1105, a transmitting device may encode a set of bits to transmit to a receiving device based on a repetition factor. The operations of 1105 may be performed according to the methods described herein. In some examples, aspects of the operations of 1105 may be performed by an encoder component as described with reference to FIGS. 6 through 9.

At 1110, the transmitting device may identify a set of data bits associated with the set of encoded bits. The operations of 1110 may be performed according to the methods described herein. In some examples, aspects of the operations of 1110 may be performed by a mapper component as described with reference to FIGS. 6 through 9.

At 1115, the transmitting device may recursively map, based on the repetition factor, the set of encoded bits to a subset of subcarriers including the adjacent subcarriers. The operations of 1115 may be performed according to the methods described herein. In some examples, aspects of the operations of 1115 may be performed by a mapper component as described with reference to FIGS. 6 through 9.

At 1120, the transmitting device may generate a signal including the set of encoded bits based on the mapping. The operations of 1120 may be performed according to the methods described herein. In some examples, aspects of the operations of 1120 may be performed by a signal component as described with reference to FIGS. 6 through 9.

At 1125, the transmitting device may transmit the generated signal to the receiving device. The operations of 1125 may be performed according to the methods described herein. In some examples, aspects of the operations of 1125 may be performed by a signal component as described with reference to FIGS. 6 through 9.

Figure 12:
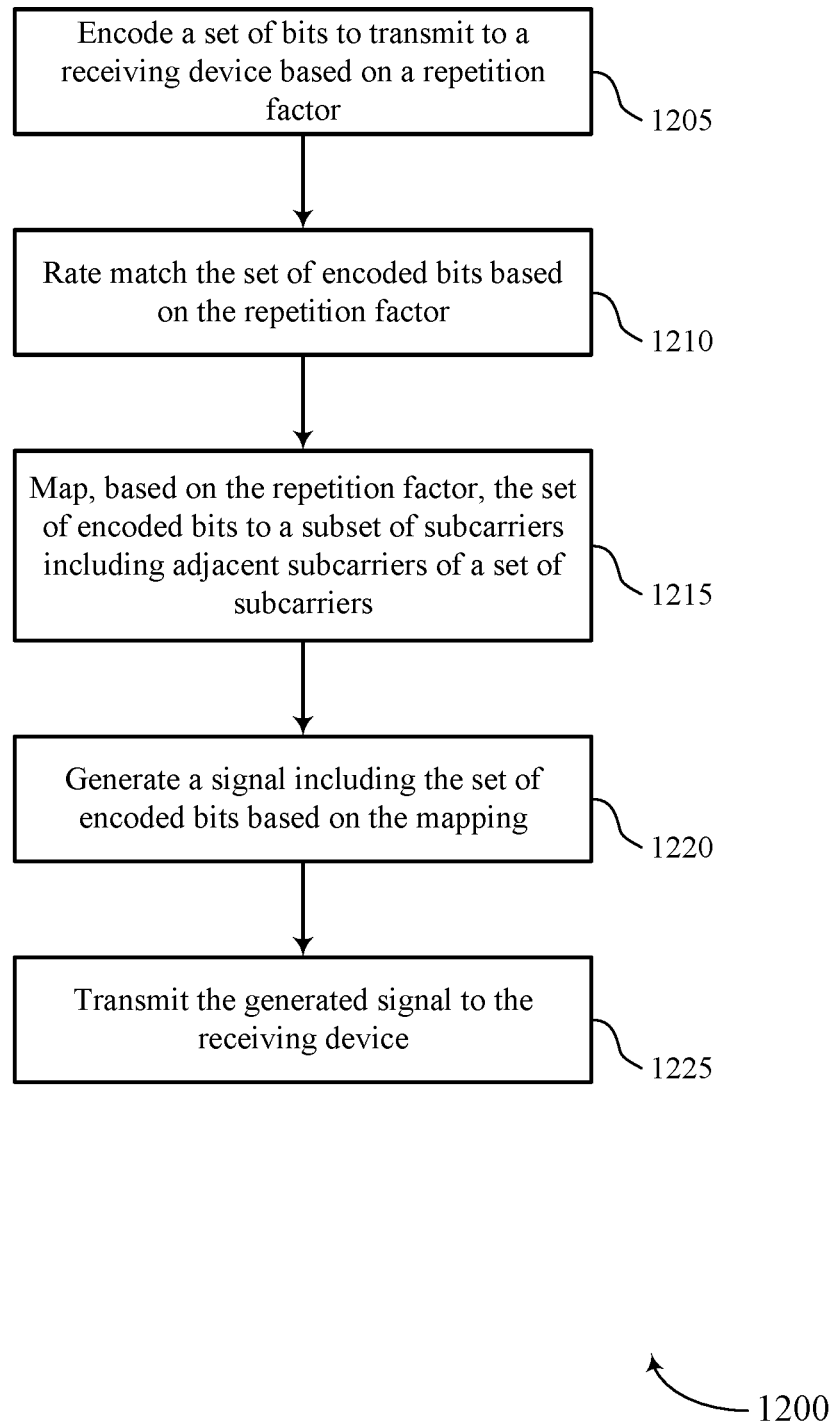

FIG. 12 shows a flowchart illustrating a method 1200 that supports repetition on subcarriers for noncoherent modulation in accordance with aspects of the present disclosure. The operations of method 1200 may be implemented by a transmitting device (e.g., a base station 105, a UE 115) or its components as described herein. For example, the operations of method 1200 may be performed by a communications manager as described with reference to FIGS. 6 through 9. In some examples, a transmitting device (e.g., a base station 105, a UE 115) may execute a set of instructions to control the functional elements of the device to perform the functions described below. Additionally or alternatively, a transmitting device (e.g., a base station 105, a UE 115) may perform aspects of the functions described below using special-purpose hardware.

At 1205, a transmitting device may encode a set of bits to transmit to a receiving device based on a repetition factor. The operations of 1205 may be performed according to the methods described herein. In some examples, aspects of the operations of 1205 may be performed by an encoder component as described with reference to FIGS. 6 through 9.

At 1210, the transmitting device may rate match the set of encoded bits based on the repetition factor. The operations of 1210 may be performed according to the methods described herein. In some examples, aspects of the operations of 1210 may be performed by a rate component as described with reference to FIGS. 6 through 9.

At 1215, the transmitting device may map, based on the repetition factor, the set of encoded bits to a subset of subcarriers including adjacent subcarriers of a set of subcarriers. The operations of 1215 may be performed according to the methods described herein. In some examples, aspects of the operations of 1215 may be performed by a mapper component as described with reference to FIGS. 6 through 9.

At 1220, the transmitting device may generate a signal including the set of encoded bits based on the mapping. The operations of 1220 may be performed according to the methods described herein. In some examples, aspects of the operations of 1220 may be performed by a signal component as described with reference to FIGS. 6 through 9.

At 1225, the transmitting device may transmit the generated signal to the receiving device. The operations of 1225 may be performed according to the methods described herein. In some examples, aspects of the operations of 1225 may be performed by a signal component as described with reference to FIGS. 6 through 9.

Figure 13:
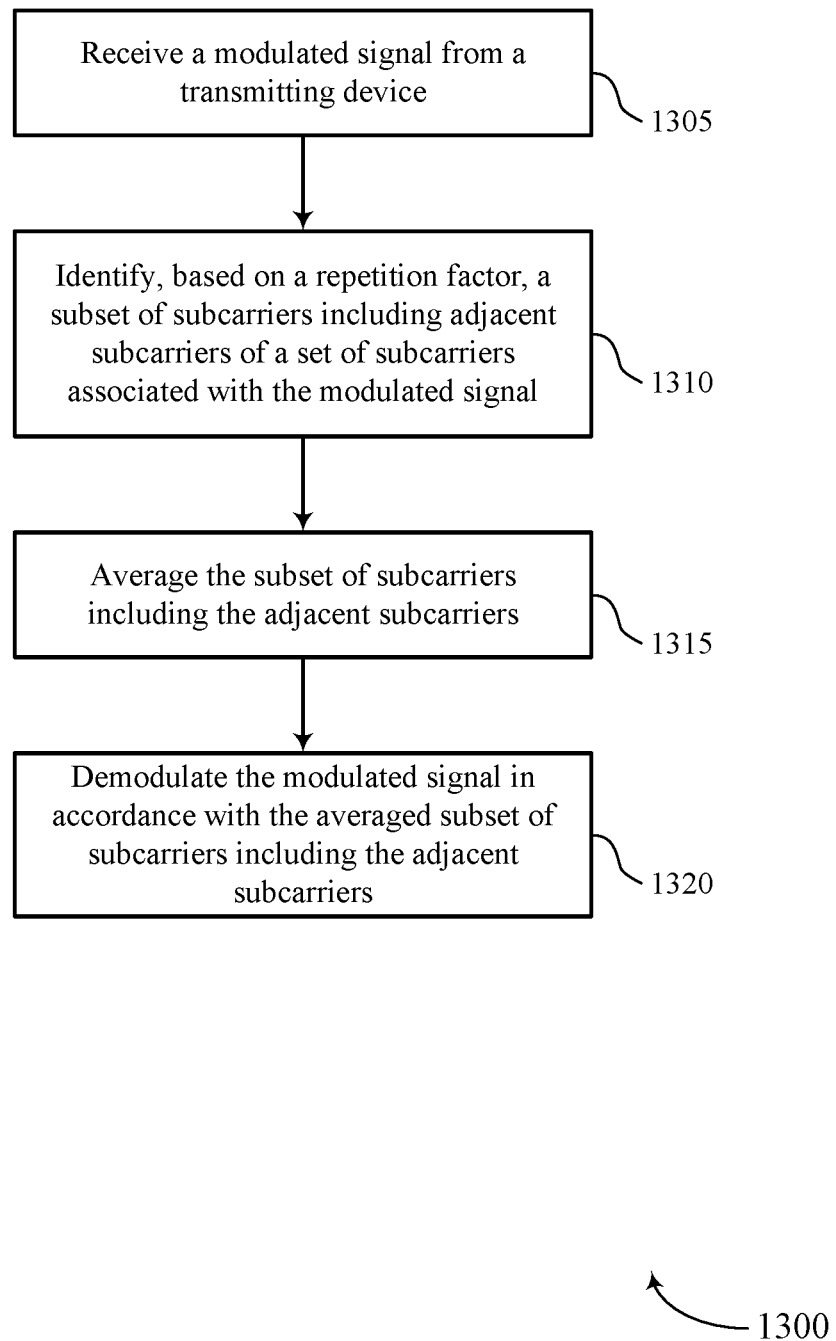

FIG. 13 shows a flowchart illustrating a method 1300 that supports repetition on subcarriers for noncoherent modulation in accordance with aspects of the present disclosure. The operations of method 1300 may be implemented by a receiving device (e.g., a base station 105, a UE 115) or its components as described herein. For example, the operations of method 1300 may be performed by a communications manager as described with reference to FIGS. 6 through 9. In some examples, a receiving device (e.g., a base station 105, a UE 115) may execute a set of instructions to control the functional elements of the device to perform the functions described below. Additionally or alternatively, a receiving device (e.g., a base station 105, a UE 115) may perform aspects of the functions described below using special-purpose hardware.

At 1305, a receiving device may receive a modulated signal from a transmitting device. The operations of 1305 may be performed according to the methods described herein. In some examples, aspects of the operations of 1305 may be performed by a signal component as described with reference to FIGS. 6 through 9.

At 1310, the receiving device may identify, based on a repetition factor, a subset of subcarriers including adjacent subcarriers of a set of subcarriers associated with the modulated signal. The operations of 1310 may be performed according to the methods described herein. In some examples, aspects of the operations of 1310 may be performed by a carrier component as described with reference to FIGS. 6 through 9.

At 1315, the receiving device may average the subset of subcarriers including the adjacent subcarriers. The operations of 1315 may be performed according to the methods described herein. In some examples, aspects of the operations of 1315 may be performed by a carrier component as described with reference to FIGS. 6 through 9.

At 1320, the receiving device may demodulate the modulated signal in accordance with the averaged subset of subcarriers including the adjacent subcarriers. The operations of 1320 may be performed according to the methods described herein. In some examples, aspects of the operations of 1320 may be performed by a demodulation component as described with reference to FIGS. 6 through 9.

Figure 14:
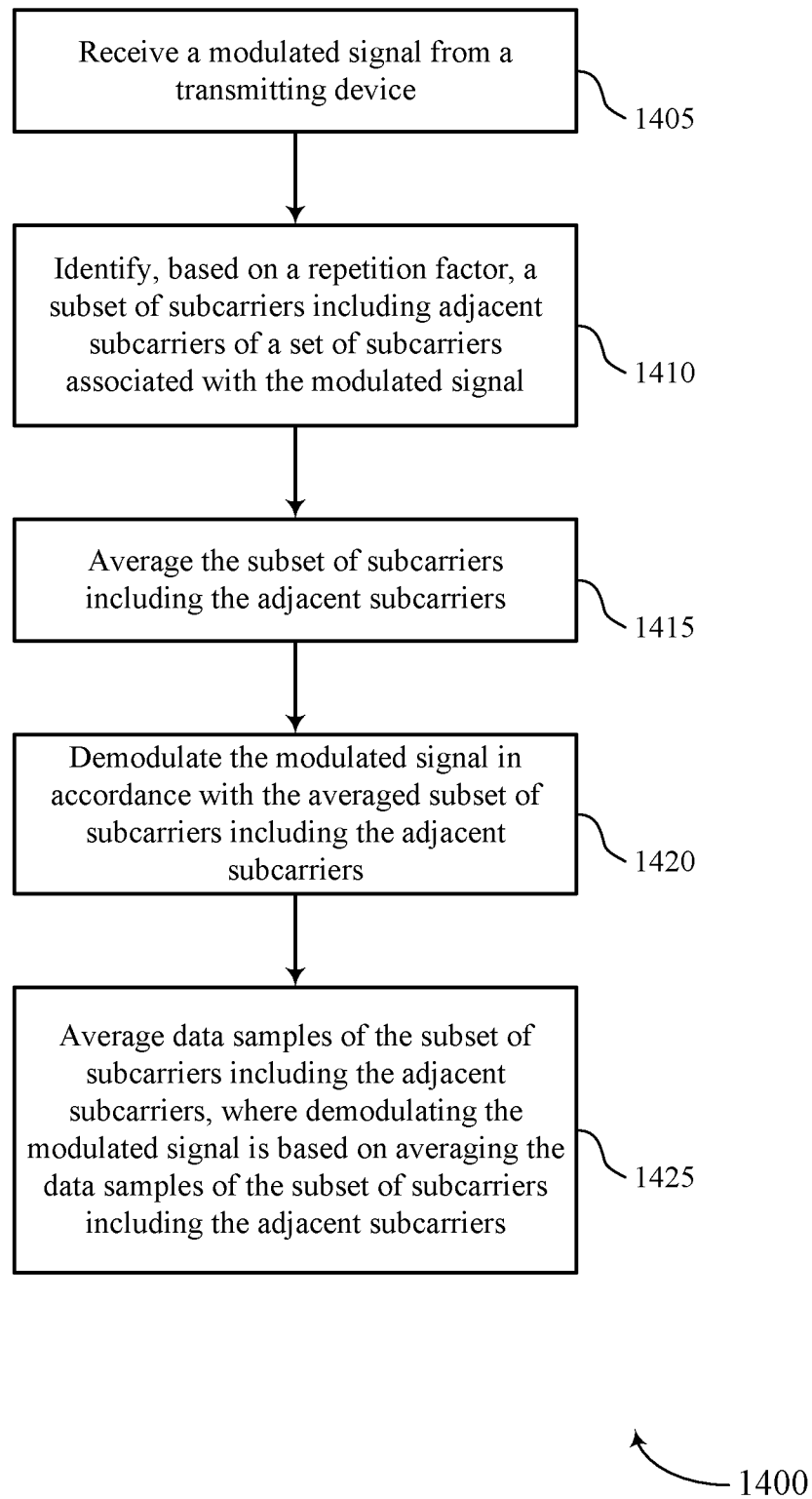

FIG. 14 shows a flowchart illustrating a method 1400 that supports repetition on subcarriers for noncoherent modulation in accordance with aspects of the present disclosure. The operations of method 1400 may be implemented by a receiving device (e.g., a base station 105, a UE 115) or its components as described herein. For example, the operations of method 1400 may be performed by a communications manager as described with reference to FIGS. 6 through 9. In some examples, a receiving device (e.g., a base station 105, a UE 115) may execute a set of instructions to control the functional elements of the device to perform the functions described below. Additionally or alternatively, a receiving device (e.g., a base station 105, a UE 115) may perform aspects of the functions described below using special-purpose hardware.

At 1405, a receiving device may receive a modulated signal from a transmitting device. The operations of 1405 may be performed according to the methods described herein. In some examples, aspects of the operations of 1405 may be performed by a signal component as described with reference to FIGS. 6 through 9.

At 1410, the receiving device may identify, based on a repetition factor, a subset of subcarriers including adjacent subcarriers of a set of subcarriers associated with the modulated signal. The operations of 1410 may be performed according to the methods described herein. In some examples, aspects of the operations of 1410 may be performed by a carrier component as described with reference to FIGS. 6 through 9.

At 1415, the receiving device may average the subset of subcarriers including the adjacent subcarriers. The operations of 1415 may be performed according to the methods described herein. In some examples, aspects of the operations of 1415 may be performed by a carrier component as described with reference to FIGS. 6 through 9.

At 1420, the receiving device may demodulate the modulated signal in accordance with the averaged subset of subcarriers including the adjacent subcarriers. The operations of 1420 may be performed according to the methods described herein. In some examples, aspects of the operations of 1420 may be performed by a demodulation component as described with reference to FIGS. 6 through 9.

At 1425, the receiving device may average data samples of the subset of subcarriers including the adjacent subcarriers, where demodulating the modulated signal is based on averaging the data samples of the subset of subcarriers including the adjacent subcarriers. The operations of 1425 may be performed according to the methods described herein. In some examples, aspects of the operations of 1425 may be performed by a carrier component as described with reference to FIGS. 6 through 9.

Figure 15:
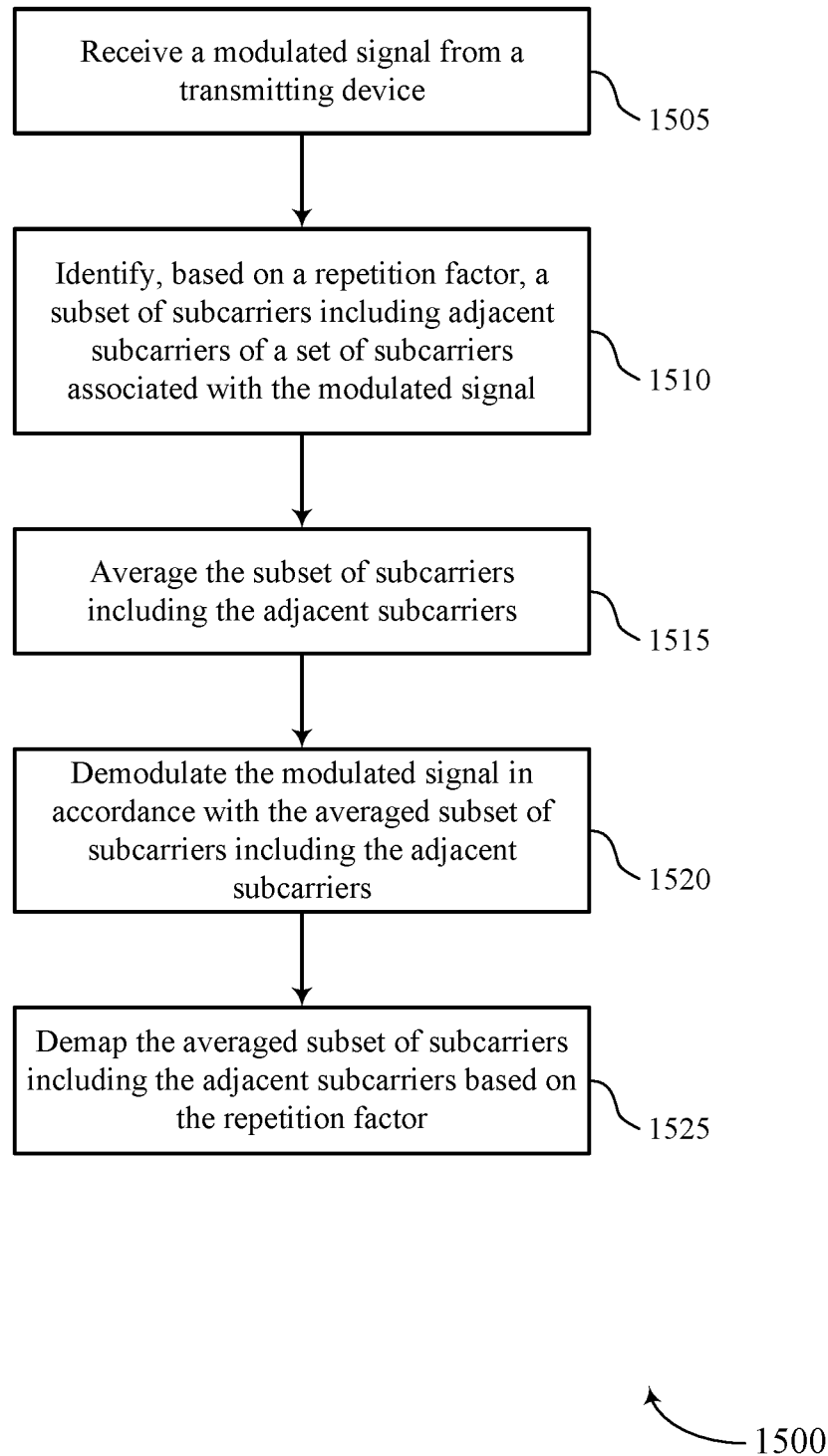

FIG. 15 shows a flowchart illustrating a method 1500 that supports repetition on subcarriers for noncoherent modulation in accordance with aspects of the present disclosure. The operations of method 1500 may be implemented by a receiving device (e.g., a base station 105, a UE 115) or its components as described herein. For example, the operations of method 1500 may be performed by a communications manager as described with reference to FIGS. 6 through 9. In some examples, a receiving device (e.g., a base station 105, a UE 115) may execute a set of instructions to control the functional elements of the device to perform the functions described below. Additionally or alternatively, a receiving device (e.g., a base station 105, a UE 115) may perform aspects of the functions described below using special-purpose hardware.

At 1505, a receiving device may receive a modulated signal from a transmitting device. The operations of 1505 may be performed according to the methods described herein. In some examples, aspects of the operations of 1505 may be performed by a signal component as described with reference to FIGS. 6 through 9.

At 1510, the receiving device may identify, based on a repetition factor, a subset of subcarriers including adjacent subcarriers of a set of subcarriers associated with the modulated signal. The operations of 1510 may be performed according to the methods described herein. In some examples, aspects of the operations of 1510 may be performed by a carrier component as described with reference to FIGS. 6 through 9.

At 1515, the receiving device may average the subset of subcarriers including the adjacent subcarriers. The operations of 1515 may be performed according to the methods described herein. In some examples, aspects of the operations of 1515 may be performed by a carrier component as described with reference to FIGS. 6 through 9.

At 1520, the receiving device may demodulate the modulated signal in accordance with the averaged subset of subcarriers including the adjacent subcarriers. The operations of 1520 may be performed according to the methods described herein. In some examples, aspects of the operations of 1520 may be performed by a demodulation component as described with reference to FIGS. 6 through 9.

At 1525, the receiving device may demap the averaged subset of subcarriers including the adjacent subcarriers based on the repetition factor. The operations of 1525 may be performed according to the methods described herein. In some examples, aspects of the operations of 1525 may be performed by a demapper component as described with reference to FIGS. 6 through 9.

Figure 16:
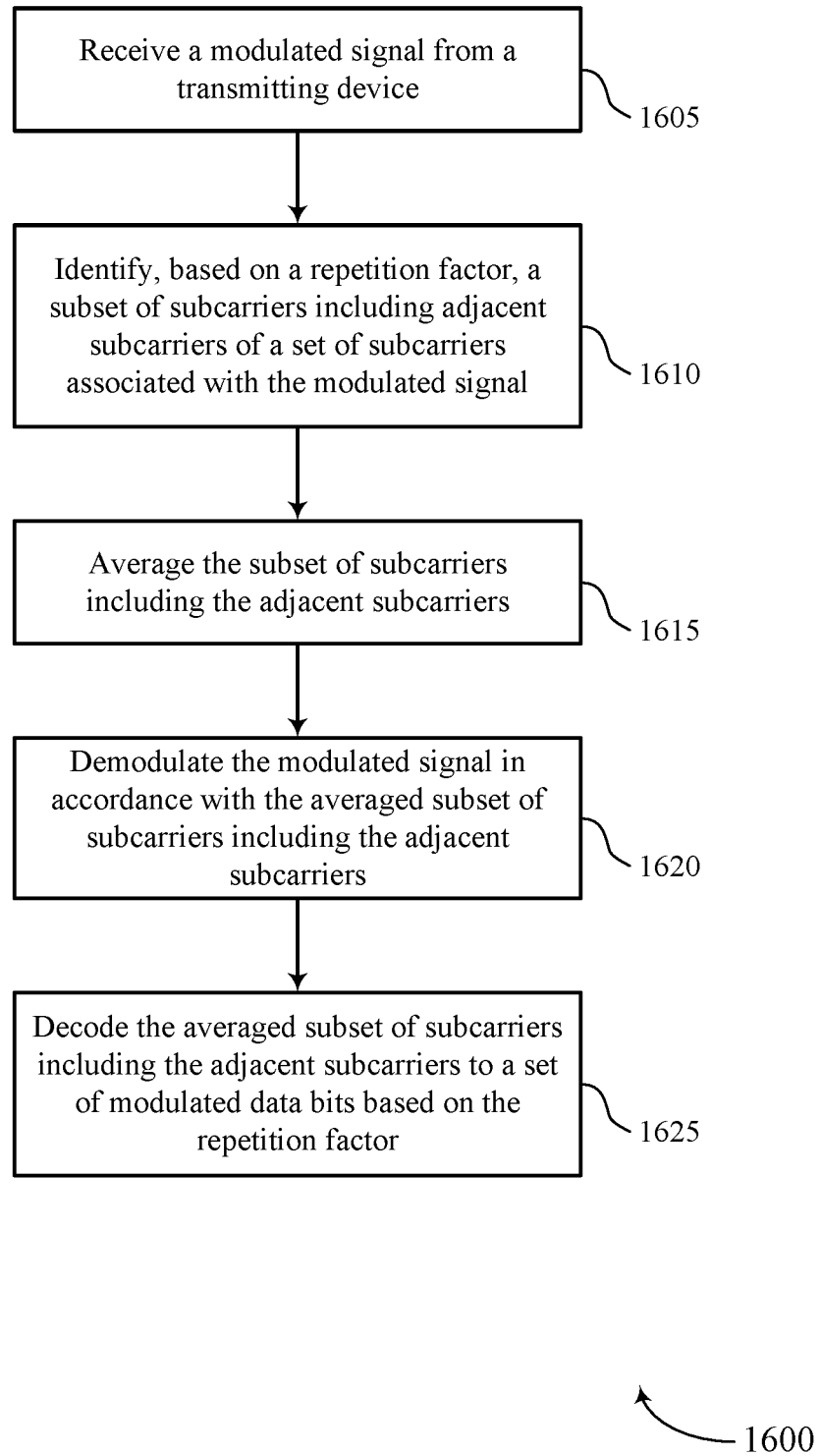

FIG. 16 shows a flowchart illustrating a method 1600 that supports repetition on subcarriers for noncoherent modulation in accordance with aspects of the present disclosure. The operations of method 1600 may be implemented by a receiving device (e.g., a base station 105, a UE 115) or its components as described herein. For example, the operations of method 1600 may be performed by a communications manager as described with reference to FIGS. 6 through 9. In some examples, a receiving device (e.g., a base station 105, a UE 115) may execute a set of instructions to control the functional elements of the device to perform the functions described below. Additionally or alternatively, a receiving device (e.g., a base station 105, a UE 115) may perform aspects of the functions described below using special-purpose hardware.

At 1605, a receiving device may receive a modulated signal from a transmitting device. The operations of 1605 may be performed according to the methods described herein. In some examples, aspects of the operations of 1605 may be performed by a signal component as described with reference to FIGS. 6 through 9.

At 1610, the receiving device may identify, based on a repetition factor, a subset of subcarriers including adjacent subcarriers of a set of subcarriers associated with the modulated signal. The operations of 1610 may be performed according to the methods described herein. In some examples, aspects of the operations of 1610 may be performed by a carrier component as described with reference to FIGS. 6 through 9.

At 1615, the receiving device may average the subset of subcarriers including the adjacent subcarriers. The operations of 1615 may be performed according to the methods described herein. In some examples, aspects of the operations of 1615 may be performed by a carrier component as described with reference to FIGS. 6 through 9.

At 1620, the receiving device may demodulate the modulated signal in accordance with the averaged subset of subcarriers including the adjacent subcarriers. The operations of 1620 may be performed according to the methods described herein. In some examples, aspects of the operations of 1620 may be performed by a demodulation component as described with reference to FIGS. 6 through 9.

At 1625, the receiving device may decode the averaged subset of subcarriers including the adjacent subcarriers to a set of modulated data bits based on the repetition factor. The operations of 1625 may be performed according to the methods described herein.

In some examples, aspects of the operations of 1625 may be performed by a decoder component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a transmitting device, comprising: encoding a set of bits to transmit to a receiving device based at least in part on a repetition factor; mapping, based at least in part on the repetition factor, the set of encoded bits to a subset of subcarriers comprising adjacent subcarriers of a set of subcarriers; generating a signal comprising the set of encoded bits based at least in part on the mapping; and transmitting the generated signal to the receiving device.

Aspect 2: The method of aspect 1, further comprising: identifying a set of data bits associated with the set of encoded bits; and recursively mapping, based at least in part on the repetition factor, the set of data bits to the subset of subcarriers comprising the adjacent subcarriers Aspect 3: The method of aspect 2, wherein recursively mapping the set of data bits comprises: mapping a first subset of data bits associated with the set of data bits to a first subset of adjacent subcarriers; and mapping a second subset of data bits associated with the set of data bits to a second subset of adjacent subcarriers based at least in part on the repetition factor.

Aspect 4: The method of any of aspects 1 through 3, further comprising: rate matching the set of encoded bits based at least in part on the repetition factor.

Aspect 5: The method of any of aspects 1 through 4, further comprising: mapping the subset of subcarriers comprising the adjacent subcarriers to a resource block based at least in part on the repetition factor; and generating the signal based at least in part on mapping the subset of subcarriers to the resource block.

Aspect 6: The method of any of aspects 1 through 5, wherein encoding the set of bits further comprises: increasing a rate of the encoding based at least in part on the repetition factor.

Aspect 7: The method of any of aspects 1 through 6, wherein the rate of the encoding comprises a value less than one.

Aspect 8: The method of any of aspects 1 through 7, wherein identifying the set of bits comprises: identifying the set of bits to transmit to the receiving device based at least in part on the repetition factor.

Aspect 9: The method of any of aspects 1 through 8, wherein a value of the repetition factor is based at least in part on an MCS value, a constellation mapping configuration, a frequency allocation parameter, or a channel condition, or any combination thereof.

Aspect 10: The method of any of aspects 1 through 9, wherein the mapping comprises a non-coherent modulation mapping.

Aspect 11: The method of any of aspects 1 through 10, further comprising: transmitting a DCI message comprising an indication of the repetition factor.

Aspect 12: The method of any of aspects 1 through 11, further comprising: identifying the repetition factor in a lookup table, wherein encoding the set of bits to transmit to the receiving device is based at least in part on identifying the repetition factor in the lookup table.

Aspect 13: The method of any of aspects 1 through 12, further comprising: transmitting an RRC connection establishment message comprising a set of parameters indicating the repetition factor per MCS.

Aspect 14: A method for wireless communications at a receiving device, comprising: receiving a modulated signal from a transmitting device; identifying, based at least in part on a repetition factor, a subset of subcarriers comprising adjacent subcarriers of a set of subcarriers associated with the modulated signal; averaging the subset of subcarriers comprising the adjacent subcarriers; and demodulating the modulated signal in accordance with the averaged subset of subcarriers comprising the adjacent subcarriers.

Aspect 15: The method of aspect 14, further comprising: averaging data samples of the subset of subcarriers comprising the adjacent subcarriers, wherein demodulating the modulated signal is based at least in part on averaging the data samples of the subset of subcarriers comprising the adjacent subcarriers.

Aspect 16: The method of aspect 15, wherein averaging the data samples of the subset of subcarriers comprises: averaging the data samples of the subset of subcarriers comprising the adjacent subcarriers based at least in part on a coherent combination of the data samples.

Aspect 17: The method of any of aspects 14 through 16, wherein demodulating the modulated signal comprises: demapping the averaged subset of subcarriers comprising the adjacent subcarriers based at least in part on the repetition factor.

Aspect 18: The method of any of aspects 14 through 17, further comprising: decoding the averaged subset of subcarriers comprising the adjacent subcarriers to a set of modulated data bits based at least in part on the repetition factor.

Aspect 19: The method of any of aspects 14 through 18, wherein the subset of subcarriers comprises repeated data based at least in part on the repetition factor.

Aspect 20: The method of any of aspects 14 through 19, further comprising: receiving a DCI message comprising an indication of the repetition factor.

Aspect 21: The method of any of aspects 14 through 20, further comprising: identifying the repetition factor in a lookup table.

Aspect 22: The method of any of aspects 14 through 21, further comprising: receiving an RRC connection establishment message comprising a set of parameters indicating the repetition factor per MCS.

Aspect 23: An apparatus for wireless communications, comprising a processor; memory coupled with the processor; and instructions stored in the memory and executable by the processor to cause the apparatus to perform a method of any of aspects 1 through 12.

Aspect 24: An apparatus for wireless communications, comprising at least one means for performing a method of any of aspects 1 through 12.

Aspect 25: A non-transitory computer-readable medium storing code for wireless communications at a transmitting device, the code comprising instructions executable by a processor to perform a method of any of aspects 1 through 12.

Aspect 26: An apparatus for wireless communications, comprising a processor; memory coupled with the processor; and instructions stored in the memory and executable by the processor to cause the apparatus to perform a method of any of aspects 14 through 21.

Aspect 27: An apparatus for wireless communications, comprising at least one means for performing a method of any of aspects 14 through 21.

Aspect 28: A non-transitory computer-readable medium storing code for wireless communications at a receiving device, the code comprising instructions executable by a processor to perform a method of any of aspects 14 through 21.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a transmitting device, comprising:
encoding a set of data bits to transmit to a receiving device using an increased encoding rate, wherein the increased encoding rate is based on an encoding rate that is scaled by a repetition factor, wherein the increased encoding rate is greater than the encoding rate;
rate matching the set of encoded data bits based at least in part on the encoding rate scaled by the repetition factor;
mapping, based at least in part on the repetition factor, the set of encoded data bits to a subset of subcarriers comprising adjacent subcarriers of a set of subcarriers;
generating a signal comprising the set of encoded data bits based at least in part on the mapping; and
transmitting the signal to the receiving device.

2. The method of claim 1, wherein mapping the set of encoded data bits further comprises:
recursively mapping, based at least in part on the repetition factor, the set of data bits to the subset of subcarriers comprising the adjacent subcarriers.

3. The method of claim 2, wherein recursively mapping the set of data bits comprises:
mapping a first subset of the set of data bits to a respective first subset of the adjacent subcarriers; and
mapping a second subset of the set of data bits to a respective second subset of the adjacent subcarriers based at least in part on the repetition factor.

4. The method of claim 1, further comprising:
mapping the subset of subcarriers comprising the adjacent subcarriers to a resource block based at least in part on the repetition factor; and
generating the signal based at least in part on mapping the subset of subcarriers to the resource block.

5. The method of claim 1, wherein encoding the set of data bits further comprises:
increasing the encoding rate based at least in part on scaling the encoding rate by the repetition factor.

6. The method of claim 5, wherein the rate of encoding scaled by the repetition factor comprises a value less than one.

7. The method of claim 1, wherein identifying the set of data bits comprises:
identifying the set of data bits to transmit to the receiving device based at least in part on the repetition factor.

8. The method of claim 1, wherein a value of the repetition factor is based at least in part on a modulation and coding scheme value, a constellation mapping configuration, a frequency allocation parameter, or a channel condition, or any combination thereof.

9. The method of claim 1, wherein the mapping comprises a non-coherent modulation mapping.

10. The method of claim 1, further comprising:
transmitting a downlink control information message comprising an indication of the repetition factor.

11. The method of claim 1, further comprising:
identifying the repetition factor in a lookup table, wherein encoding the set of data bits to transmit to the receiving device is based at least in part on identifying the repetition factor in the lookup table.

12. The method of claim 1, further comprising:
transmitting a radio resource control connection establishment message comprising a set of parameters indicating the repetition factor per modulation and coding scheme.

13. An apparatus for wireless communications, comprising:
one or more processors,
memory coupled with the one or more processors; and
instructions stored in the memory and executable by the one or more processors to cause the apparatus to:
encode a set of data bits to transmit to a receiving device using an increased encoding rate, wherein the increased encoding rate is based on an encoding rate that is scaled by a repetition factor, wherein the increased encoding rate is greater than the encoding rate;
rate match the set of encoded data bits based at least in part on the encoding rate scaled by the repetition factor;
map, based at least in part on the repetition factor, the set of encoded data bits to a subset of subcarriers comprising adjacent subcarriers of a set of subcarriers;
generate a signal comprising the set of encoded data bits based at least in part on the mapping; and
transmit the signal to the receiving device.

14. The apparatus of claim 13, wherein the instructions to map the set of encoded data bits are further executable by the one or more processors to cause the apparatus to:
recursively map, based at least in part on the repetition factor, the set of data bits to the subset of subcarriers comprising the adjacent subcarriers.

15. The apparatus of claim 14, wherein the instructions to recursively map the set of data bits are executable by the one or more processors to cause the apparatus to:
map a first subset of the set of data bits to a respective first subset of the adjacent subcarriers; and
map a second subset of the set of data bits to a respective second subset of the adjacent subcarriers based at least in part on the repetition factor.

16. The apparatus of claim 13, wherein the instructions are further executable by the one or more processors to cause the apparatus to:
map the subset of subcarriers comprising the adjacent subcarriers to a resource block based at least in part on the repetition factor; and
generate the signal based at least in part on mapping the subset of subcarriers to the resource block.

17. The apparatus of claim 13, wherein the instructions to encode the set of data bits are further executable by the one or more processors to cause the apparatus to:
increase the encoding rate based at least in part on scaling the encoding rate by the repetition factor.

18. The apparatus of claim 17, wherein the rate of encoding scaled by the repetition factor comprises a value less than one.

19. The apparatus of claim 13, wherein the instructions to identify the set of data bits are executable by the one or more processors to cause the apparatus to:
identify the set of data bits to transmit to the receiving device based at least in part on the repetition factor.

20. The apparatus of claim 13, wherein a value of the repetition factor is based at least in part on a modulation and coding scheme value, a constellation mapping configuration, a frequency allocation parameter, or a channel condition, or any combination thereof.

21. The apparatus of claim 13, wherein the mapping comprises a non-coherent modulation mapping.

22. The apparatus of claim 13, wherein the instructions are further executable by the one or more processors to cause the apparatus to:
transmit a downlink control information message comprising an indication of the repetition factor.

23. The apparatus of claim 13, wherein the instructions are further executable by the one or more processors to cause the apparatus to:
identify the repetition factor in a lookup table, wherein encoding the set of data bits to transmit to the receiving device is based at least in part on identifying the repetition factor in the lookup table.

24. The apparatus of claim 13, wherein the instructions are further executable by the one or more processors to cause the apparatus to:
transmit a radio resource control connection establishment message comprising a set of parameters indicating the repetition factor per modulation and coding scheme.

25. An apparatus for wireless communications at a transmitting device, comprising:
means for encoding a set of data bits to transmit to a receiving device using an increased encoding rate, wherein the increased encoding rate is based on an encoding rate that is scaled by a repetition factor, wherein the increased encoding rate is greater than the encoding rate;
means for rate matching the set of encoded data bits based at least in part on the encoding rate scaled by the repetition factor;
means for mapping, based at least in part on the repetition factor, the set of encoded data bits to a subset of subcarriers comprising adjacent subcarriers of a set of subcarriers;
means for generating a signal comprising the set of encoded data bits based at least in part on the mapping; and
means for transmitting the signal to the receiving device.

26. The apparatus of claim 25, wherein the means for mapping the set of encoded data bits further comprises:
means for recursively mapping, based at least in part on the repetition factor, the set of data bits to the subset of subcarriers comprising the adjacent subcarriers.

27. The apparatus of claim 26, wherein the means for recursively mapping the set of data bits comprise:
means for mapping a first subset of data bits associated with the set of data bits to a respective first subset of the adjacent subcarriers; and
means for mapping a second subset of data bits associated with the set of data bits to a respective second subset of the adjacent subcarriers based at least in part on the repetition factor.

28. A non-transitory computer-readable medium storing code for wireless communications at a transmitting device, the code comprising instructions executable by a processor to:
encode a set of data bits to transmit to a receiving device using an increased encoding rate, wherein the increased encoding rate is based on an encoding rate that is scaled by a repetition factor, wherein the increased encoding rate is greater than the encoding rate;
rate matching the set of encoded data bits based at least in part on the encoding rate scaled by the repetition factor;
mapping, based at least in part on the repetition factor, the set of encoded data bits to a subset of subcarriers comprising adjacent subcarriers of a set of subcarriers;
generate a signal comprising the set of encoded data bits based at least in part on the mapping; and
transmit the signal to the receiving device.

* * * * *